United States Patent
Haigh

(10) Patent No.: US 10,742,619 B1
(45) Date of Patent: Aug. 11, 2020

(54) SECURE AUTHENTICATION FOR A COMPUTING ENVIRONMENT

(71) Applicant: SAS Institute Inc., Cary, NC (US)

(72) Inventor: Charles Douglas Haigh, Cary, NC (US)

(73) Assignee: SAS INSTITUTE INC., Cary, NC (US)

(*) Notice: Subject to any disclaimer, the term of this patent is extended or adjusted under 35 U.S.C. 154(b) by 0 days.

(21) Appl. No.: 16/751,901

(22) Filed: Jan. 24, 2020

Related U.S. Application Data

(60) Provisional application No. 62/835,773, filed on Apr. 18, 2019.

(51) Int. Cl.
*H04L 29/06* (2006.01)
*G06F 11/20* (2006.01)

(52) U.S. Cl.
CPC ...... *H04L 63/0442* (2013.01); *G06F 11/2023* (2013.01); *H04L 63/062* (2013.01); *H04L 63/083* (2013.01); *H04L 63/0807* (2013.01); *H04L 63/101* (2013.01)

(58) Field of Classification Search
CPC ............... H04L 63/0442; H04L 63/062; H04L 63/0807; H04L 63/083; H04L 63/101; G06F 11/2023
See application file for complete search history.

(56) References Cited

U.S. PATENT DOCUMENTS

| | | | |
|---|---|---|---|
| 8,739,260 B1* | 5/2014 | Damm-Goossens | ........................ H04L 9/0891 726/7 |
| 2010/0131755 A1* | 5/2010 | Zhu | ...................... H04L 63/0815 713/155 |
| 2011/0185407 A1* | 7/2011 | Perrot | ................... H04L 9/3273 726/6 |
| 2012/0066756 A1* | 3/2012 | Vysogorets | ............. G06F 21/34 726/9 |

(Continued)

OTHER PUBLICATIONS

"3.4. Authentication methods", accessed via internet on Jul. 9, 2019 at https://access.redhat.com/documentation/en-US/red_hat_enterprise_MRG/1.3/html/grid_user guide, 6 pages.

(Continued)

*Primary Examiner* — Sarah Su
(74) *Attorney, Agent, or Firm* — Kilpatrick Townsend & Stockton LLP

(57) ABSTRACT

In one example, a control node can receive a job request from a client device to perform a job using a computing environment, where the job request includes first secure information and second secure information. The control node can authenticate the user by validating the second secure information using a first secret key. The control node can then obtain access to a job-execution service of a server node within the computing environment using the first secure information. For example, the control node can use the first secure information to obtain third secure information that is specific to the server node, and then transmit the (Continued)

third secure information to the server node. The server node can validate the third secure information and responsively authorize the control node to access the job-execution service. The control node can then initiate execution of the job on the server node on behalf of the user.

30 Claims, 14 Drawing Sheets

(56) References Cited

U.S. PATENT DOCUMENTS

| | | | | |
|---|---|---|---|---|
| 2015/0092233 | A1* | 4/2015 | Park | H04N 1/00307 358/1.15 |
| 2015/0350208 | A1* | 12/2015 | Bayramkul | H04L 63/08 726/9 |
| 2017/0195879 | A1* | 7/2017 | Jones-McFadden | G06Q 20/227 |
| 2019/0050170 | A1* | 2/2019 | Ren | G06F 3/1203 |
| 2019/0050551 | A1* | 2/2019 | Goldman-Kirst | G06F 21/335 |
| 2019/0155557 | A1* | 5/2019 | Shirai | G06F 3/1247 |
| 2019/0303875 | A1* | 10/2019 | Nishikawa | H04N 1/00949 |

OTHER PUBLICATIONS

"3.6 Security", University of Cambridge, Department of Computer Science and Technology Manuals, accessed via internet on Jun. 26, 2019 at https://www.cl.cam.ac.uk/manuals/condor-V68_3-Manual/3_6Security.html, 28 pages.

"Apache 2.9.2—YARN Application Security", accessed via internet on Jun. 26, 2019 at https://hadoop.apache.org/docs/current/hadoop-yarn/hadoop-yarn-site/YarnApplicationSecurity.html, 9 pages.

"Globus-k5: Acquire Kerberos Credentials for use with Grid Services", accessed via internet on Jun. 26, 2019 at https://www.systutorials.com/docs/linux/man/8-globus-k5/, 5 pages.

"Grid Security Infrastructure (GSI) v2: Frequently Asked Questions", accessed via internet on Jun. 26, 2019 at http://toolkit.globus.org/toolkit/docs/2.4/gsi/faq.html, 2 pages.

"Introduction to IBM Spectrum LSF", accessed via internet on Jun. 26, 2019 at https://www.ibm.com/support/knowledgecenter/de/SSWRJV_10.1.0/lsf_foundations/lsf_introduction_to.html, 4 pages.

"Univa Grid Engine: Enterprise-class workload scheduling and optimization solution", Univa Corporation, 2019, 2 pages.

Beckles, "Building a secure Condor® pool in an open academic environment", University of Cambridge Computing Service, Dec. 2010, 8 pages.

Dussa, "Kerberos-Based Authentication in Grid Computing", Diploma Thesis at the Institute of Telematics, University of Karlsruhe (TH), Dec. 31, 2003, 113 pages.

Garman, "Kerberos: The Definitive Guide", accessed via internet on Jun. 26, 2019 at https://www.oreilly.com/library/view/kerberos-the-definitive/0596004036/index.html, 3 pages.

"Authentication Service Exchange", accessed via internet on Jul. 16, 2019 at https://docs.microsoft.com/en-us/windows/win32/secauthn/authentication-service-exchange, 2 pages.

Elias, How to Link two SQK Server Instances with Kerberos, accessed via internet on Jul. 16, 2019 at http://www.sqlshack.com/how-to-link-two-sql-server-instances-with-kerberos/, 15 pages.

"Kerberos (protocol) definition", accessed via internet on Jul. 16, 2019 at https://en.wikipedia.org/wiki/Kerberos_(protocol), 7 pages.

Microsoft Kerberos—Windows Applications "Microsoft Kerberos", accessed via internet on Jul. 16, 2019 at https://docs.microsoft.com/en-us/windows/win32/secauthn/microsoft-kerberos, 2 pages.

Rouse, Margaret and Lockhart, Eddie, "Microsoft Windows Defender Credential Guard", accessed via internet Jul. 16, 2019 at https://searchenterprisedesktop.techtarget.com/definition/microsoft-windows-defender-credential-guard, 4 pages.

"3.6 Security", University of Wisconsin—Madison, Computer Sciences, accessed via internet on Jun. 26, 2019 at https://research.cs.wisc.edu/htcondor/manual/v7.8/3_6Security.html, 38 pages.

"Kerberos authentication", accessed via internet on Jun. 26, 2019 at https://www.ibm.com/support/knowledgecenter/en/SSWRJV_10.1.0/lsf_admin/chap_kerberos_auth_lsf.html, 3 pages.

"Kerberos Authentication Setup—Teradata QueryGrid Installation and User Guide", accessed via internet on Jun. 26, 2019 at https://docs.teradata.com/reader/iiTX2KgpxwEIEnmVK2TS6A/OVFFFZzC695eQ~Ra~TlyjA, 1 page.

"SSPI/Kerberos Interoperability with GSSAPI", accessed via internet on Jul. 16, 2019 at https://docs.microsoft.com/en-us/windows/win32/secauthn/sspi-kerberos-interoperability-with-gssapi, 5 pages.

Univa Engineering, "Grid Engine Users's Guide, Version 8.5.4", Univa Corporation, Grid Engine Documentation, dated Oct. 18, 2017, 113 pages.

* cited by examiner

SECURE AUTHENTICATION FOR A COMPUTING ENVIRONMENT

REFERENCE TO RELATED APPLICATION

This claims the benefit of priority under 35 U.S.C. § 119(e) to U.S. Provisional Patent Application No. 62/835,773, filed Apr. 18, 2019 and titled "Workload Orchestrator," the entirety of which is hereby incorporated by reference herein.

TECHNICAL FIELD

The present disclosure relates generally to authentication in computing environments. More specifically, but not by way of limitation, this disclosure relates to secure authentication for a computing environment.

BACKGROUND

Computer security is of paramount importance in today's technological world. To that end, a variety of authentication approaches have been developed to enable users to securely login to computer systems and applications. One example of a typical authentication approach involves validating a user's authentication credentials (e.g., username and password). A user may supply the authentication credentials to a computing environment, such as a data grid or cloud computing system, to login to the computing environment. If the authentication credentials are valid, the user is allowed to login to the computing environment. Once logged in to the computing environment, the user may need to supply additional authentication credentials to access various services of the computing environment. For example, the user may need to supply a different set of authentication credentials (e.g., a different username and password combination) to the computing environment to obtain access a job-execution service of the computing environment. Having this additional layer of security may prevent malicious actors (e.g., hackers) from accessing the services in the computing environment and wreaking havoc, should they gain unauthorized access to the computing environment.

SUMMARY

One example of the present disclosure includes a control node comprising a processing device and a memory device including instructions that are executable by the processing device. The instructions are executable for causing the processing device to receive a job request from a client device to perform a job using a computing environment that includes the control node, the job request including first secure information that is unique to a user of the client device and second secure information that is unique to a service of the control node. The instructions are executable for causing the processing device to, in response to the job request, authenticate the user to access the service of the control node by validating the second secure information using a first secret key that is unique to the service. The instructions are executable for causing the processing device to, subsequent to authenticating the user to access the service, obtain access to a job-execution service of a server node of the computing environment using the first secure information by performing operations. The operations can include transmitting the first secure information to an authentication entity; receiving third secure information back from the authentication entity in response to the authentication entity validating the first secure information, the third secure information being unique to the job-execution service of the server node; and/or transmitting the third secure information to the server node, the server node being configured to validate the third secure information using a second secret key and responsively authorize the control node to access the job-execution service on behalf of the user. The instructions are further executable for causing the processing device to, in response to obtaining access to the job-execution service, initiate execution of the job on the server node on behalf of the user.

Another example of the present disclosure includes a non-transitory computer-readable medium comprising program code that is executable by the processing device. The program code is executable for causing the processing device to receive a job request from a client device to perform a job using a computing environment that includes the control node, the job request including first secure information that is unique to a user of the client device and second secure information that is unique to a service of the control node. The program code is executable for causing the processing device to, in response to the job request, authenticate the user to access the service of the control node by validating the second secure information using a first secret key that is unique to the service. The program code is executable for causing the processing device to, subsequent to authenticating the user to access the service, obtain access to a job-execution service of a server node of the computing environment using the first secure information by performing operations. The operations can include transmitting the first secure information to an authentication entity; receiving third secure information back from the authentication entity in response to the authentication entity validating the first secure information, the third secure information being unique to the job-execution service of the server node; and/or transmitting the third secure information to the server node, the server node being configured to validate the third secure information using a second secret key and responsively authorize the control node to access the job-execution service on behalf of the user. The program code is further executable for causing the processing device to, in response to obtaining access to the job-execution service, initiate execution of the job on the server node on behalf of the user.

Yet another example of the present disclosure includes a method. The method can include receiving a job request from a client device to perform a job using a computing environment that includes the control node, the job request including first secure information that is unique to a user of the client device and second secure information that is unique to a service of the control node. The method can include, in response to the job request, authenticating the user to access the service of the control node by validating the second secure information using a first secret key that is unique to the service. The method can include, subsequent to authenticating the user to access the service, obtaining access to a job-execution service of a server node of the computing environment using the first secure information by performing operations. The operations can include transmitting the first secure information to an authentication entity; receiving third secure information back from the authentication entity in response to the authentication entity validating the first secure information, the third secure information being unique to the job-execution service of the server node; and/or transmitting the third secure information to the server node, the server node being configured to validate the third secure information using a second secret key and responsively authorize the control node to access the job-execution service on behalf of the user. The method can include, in response to obtaining access to the job-execution service, initiating execution of the job on the server node on behalf of the user. Some or all of the method can be implemented by a processing device, such as a processing device of a control node.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures.

Figure 1:
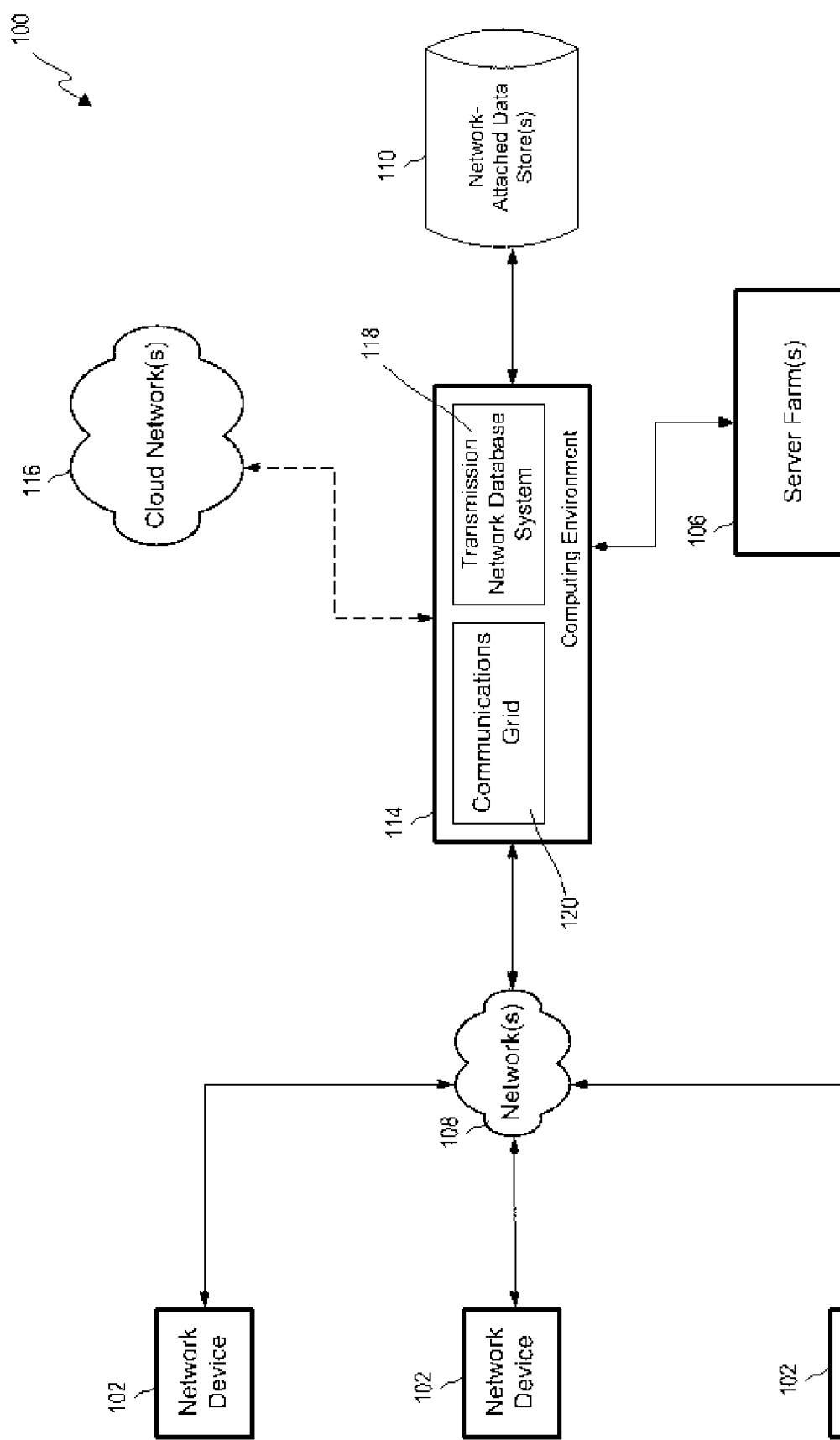
FIG. 1 is a block diagram of an example of the hardware components of a computing system according to some aspects.

In the appended figures, similar components or features can have the same reference number. Further, various components of the same type can be distinguished by following the reference number with a lowercase letter. If only the reference number is used in the specification without the lowercase letter, the description is applicable to any one of the similar components having the same reference number irrespective of the lowercase letter.

DETAILED DESCRIPTION

A variety of traditional authentication approaches exist to increase the security of computer systems. One traditional authentication approach involves validating a user's authentication credentials. A user may supply the authentication credentials to a computing environment to login to the computing environment. If the authentication credentials are valid, the user is allowed to login to the computing environment. Once logged in to the computing environment, the user may need to supply additional authentication credentials to access various services of the computing environment. While having this additional layer of security minimizes damage caused by malicious actors that gain unauthorized access to the system, it is also a large inconvenience to regular users, who must remember multiple combinations of usernames and passwords and manually enter them sequentially.

Another traditional authentication approach attempts to avoid the inconveniences of the first approach above. This second approach involves a user supplying authentication credentials to a computing environment to login to the computing environment. If the authentication credentials are valid, the user is logged in to the computing environment and the computing environment automatically propagates the authentication credentials to its various services to log the user into those services (e.g., so the user can access those services), thereby simplifying the login process for the user. But this approach requires the authentication credentials for accessing the services to be the same as the authentication credentials to login to the computing environment. And having only one set of authentication credentials that is common among the computing environment and all of its services, rather than requiring multiple sets of authentication credentials for the computing environment and its services, is far less secure because a malicious attacker need only crack one set of authentication credentials to have widespread access in the computing environment. This approach also requires the user's authentication credentials to be communicated through the computing environment. And if the computing environment has been breached by a malicious actor, the malicious actor can intercept these communications and obtain the user's authentication credentials, providing the malicious actor with even greater access to the computing environment. Thus, both of the above traditional authentication approaches are suboptimal.

Yet another traditional authentication approach attempts to find a balance between the first two approaches. This third approach involves the user's authentication credentials for logging into the computing environment being different from the user's authentication credentials for accessing the services. In this approach, the computing environment stores the user's service authentication credentials in an internal database of the computing environment. After the user logs into the computing environment, the computing environment accesses the database to obtain the user's service authentication credentials and automatically propagates the user's service authentication credentials to the various services, thereby logging the user into those services. This provides improved security over the second approach (since the user's authentication credentials for logging into the computing environment are different from the user's service authentication credentials), while still providing the single sign-on convenience via automatic propagation of the user's service authentication credentials. But this third approach requires the user's service authentication credentials to persist (remain stored) in the computing environment, which decreases security.

Another traditional authentication approach involves validating job submissions using tokens or encrypted tickets. With this approach, a user can submit a job to the computing environment for execution along with an encrypted ticket. The computing environment validates the encrypted ticket and, if it is valid, executes the necessary services to perform the job. Since the encrypted ticket does not include the user's authentication credentials, there is no authentication or storage of the user's authentication credentials by the computing environment, which helps to improve security. And since the user does not separately login to the services, this approach improves the speed at which a user can perform a job. However, this approach also has fewer total layers of security, since neither the user nor the computing environment separately logs into the services required to execute the job; instead, the computing environment has root access to all the services and simply executes them as needed to perform the job. As a result, a malicious actor that obtains unauthorized access to the computing environment will have widespread access to its services and can wreak a lot of havoc. Another problem with this approach is that it is greatly limiting on the types of jobs that can be performed. Many jobs require a computing environment to access external resources outside the computing environment to perform at least a portion of the job. Those external resources often require authentication for access, and the computing environment typically submits the user's authentication credentials to those external services in order to access them. But with tokens or encrypted tickets, the computing environment lacks the necessary authentication credentials to access the external services. As a result, the computing environment cannot access those external resources and is consequently greatly limited on the types of jobs it can perform.

Other traditional authentication processes have similar problems in that they are time consuming or labor intensive for the user, require the user's authentication credentials to be propagated through or stored within the computing environment, prevent or limit use of external resources outside the computing environment, or otherwise tradeoff speed and efficiency for security and usability.

Some examples of the present disclosure involve a unique authentication process that overcomes one or more of the abovementioned problems. The authentication process involves generating first secure information that is associated with a user, but that excludes the user's authentication credentials. The first secured information is then used to establish a chain of authentication from the user to a target service in a computing environment through at least one intermediary service, so that the user can access the target service. For each service in the chain, the computing environment can use the first secure information to obtain additional secure information (e.g., an encrypted service ticket) that is unique to that service and that also excludes the user's authentication credentials, and then use the additional secure information to obtain access to the service. This process is repeated for each service in the chain until the chain of authentication has been established between the user and the target service, so as to enable the user to perform functions using the target service. In this way, the user is automatically logged in to the various intermediate services and the target service quickly, without the user having to manually enter in different sets of authentication credentials, all while maintaining a high level of security by having unique authentication qualifications for each service. The user's authentication credentials are also never stored within or communicated through the computing environment, thereby preventing malicious actors from intercepting them.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-10 depict examples of systems and methods usable for secure authentication according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that may be collectively be referred to herein as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data to a network-attached data store 110 for storage. The computing environment 114 may later retrieve the data from the network-attached data store 110 and use the data.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108.

Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for secure authentication. For example, the computing environment 114, a network device 102, or both can implement one or more versions of the processes discussed with respect to any of the figures.

Figure 2:
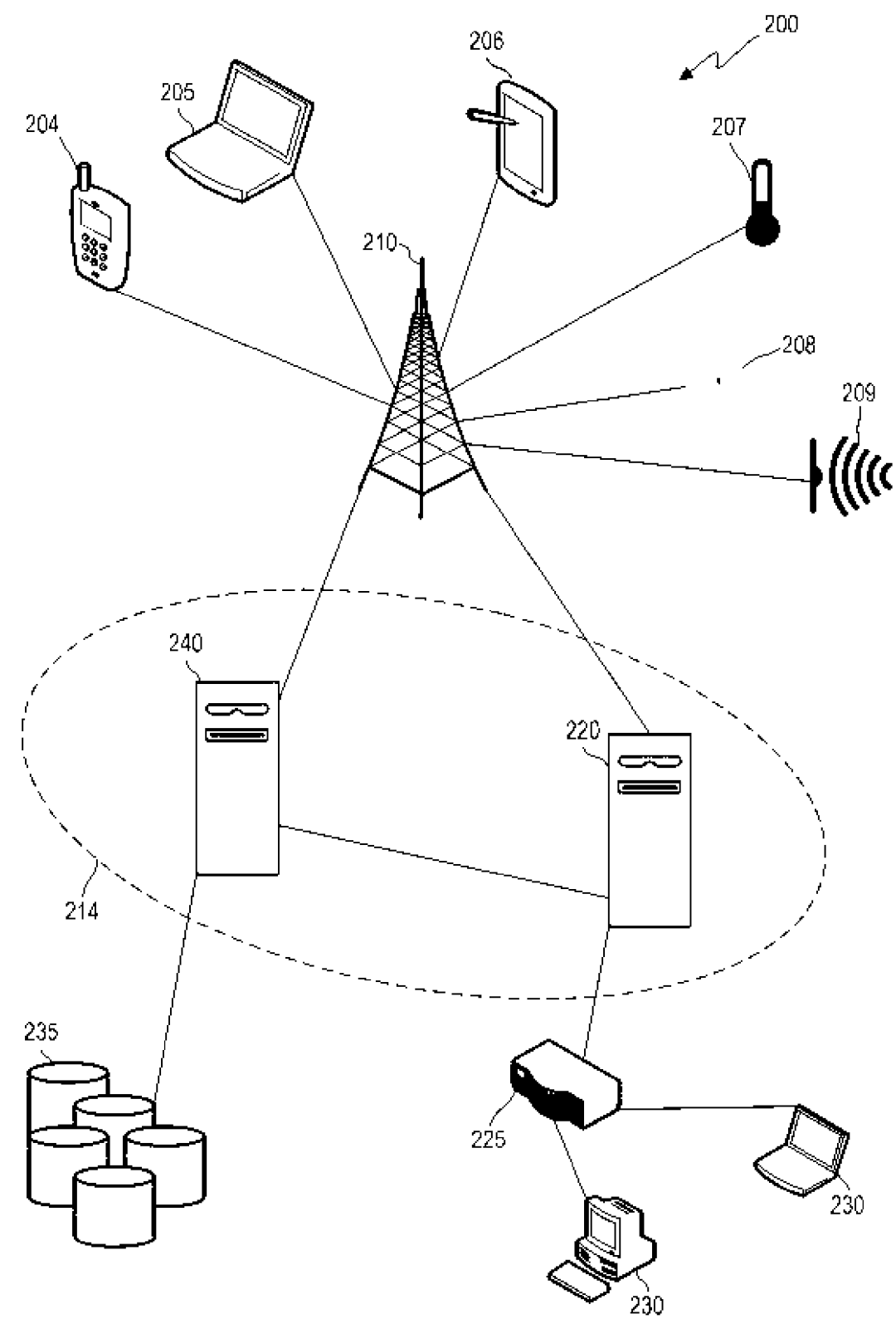
FIG. 2 is an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing.

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project, the computing environment 214 can perform a pre-analysis of the data. The pre-analysis can include determining whether the data is in a correct format and, if not, reformatting the data into the correct format.

Figure 3:
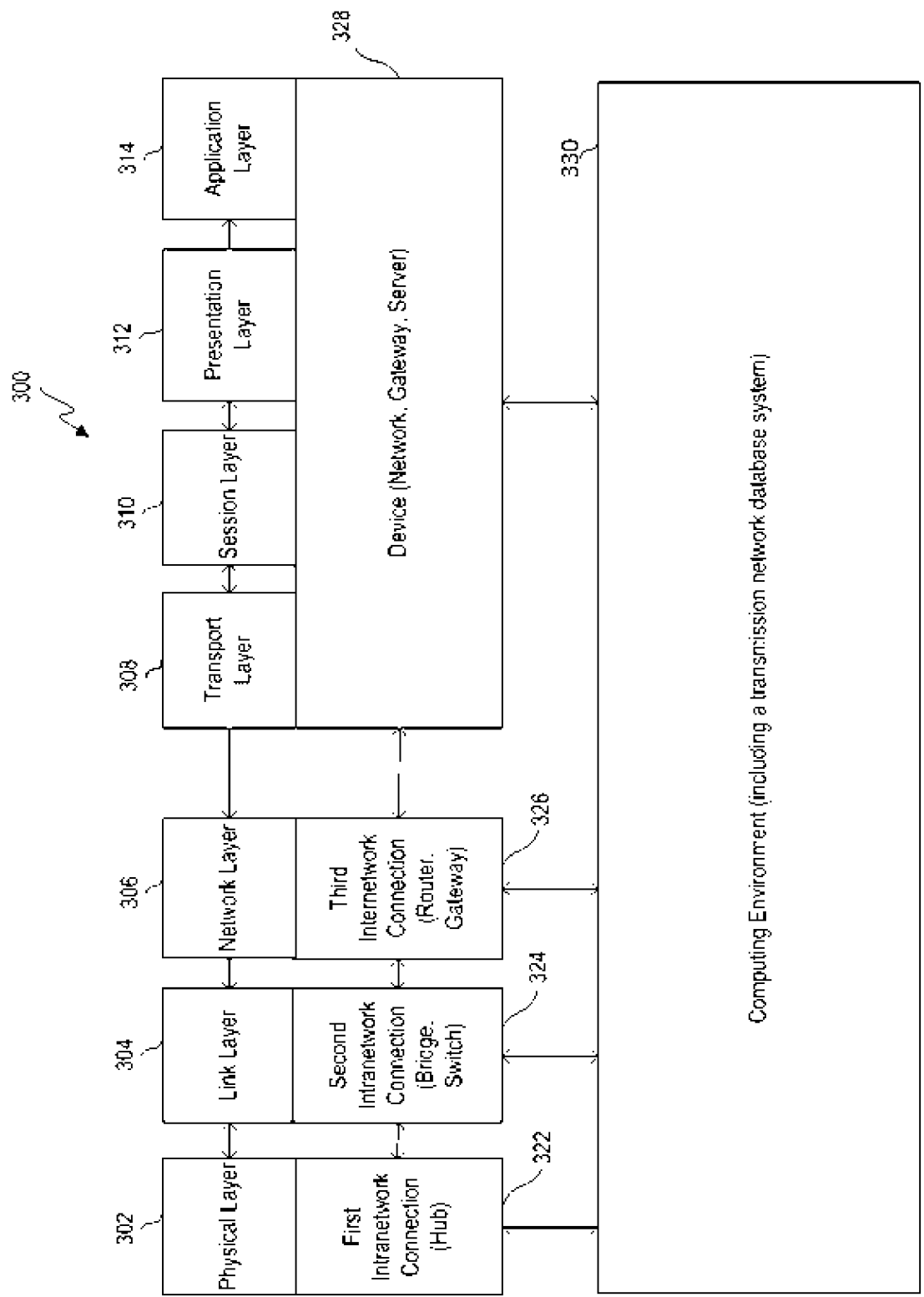
FIG. 3 is a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A grid computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid.

Figure 4:
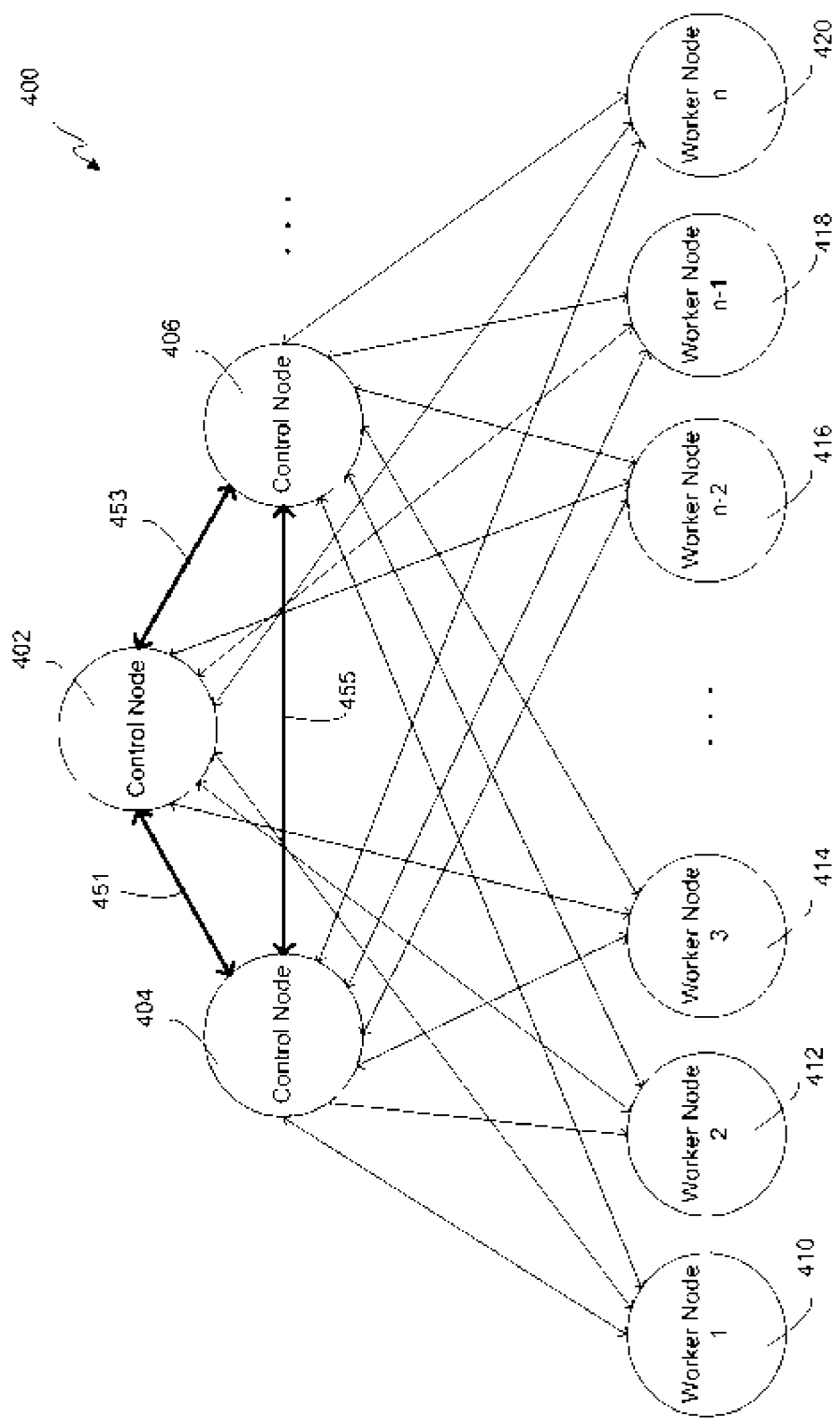
FIG. 4 is a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node. The project may include a data set. The data set may be of any size and can include a time series. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may perform a job using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
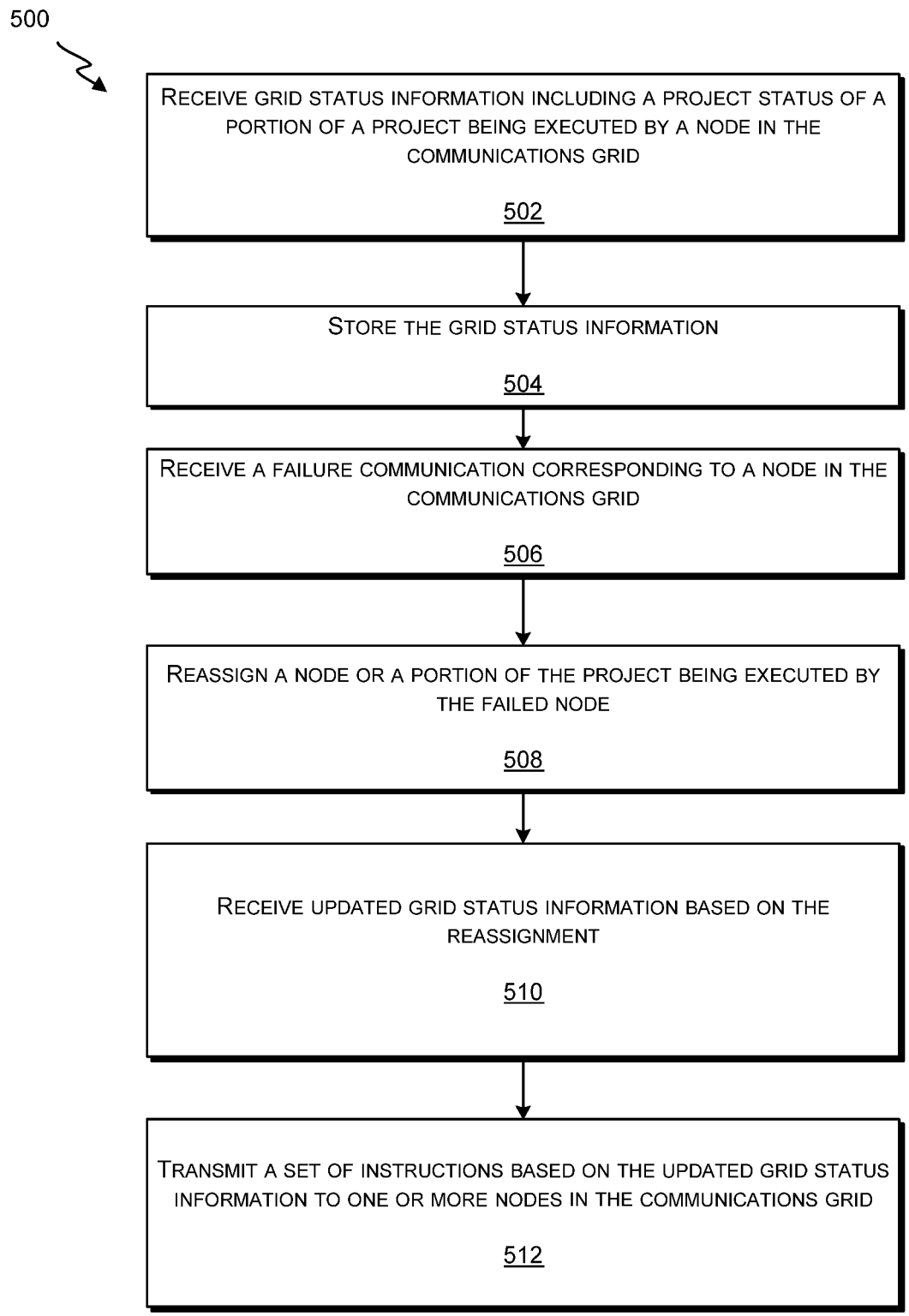
FIG. 5 is a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
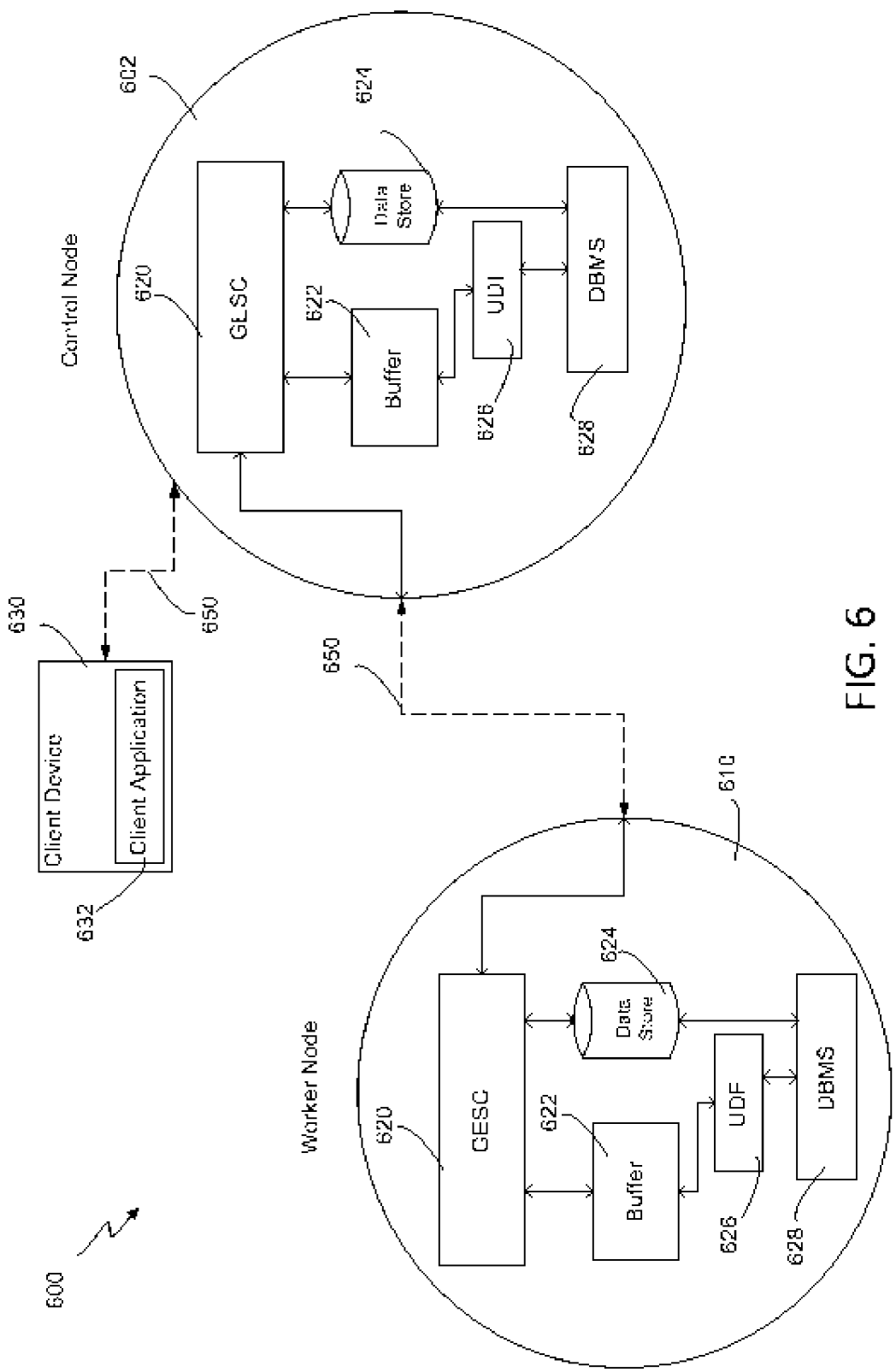
FIG. 6 is a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
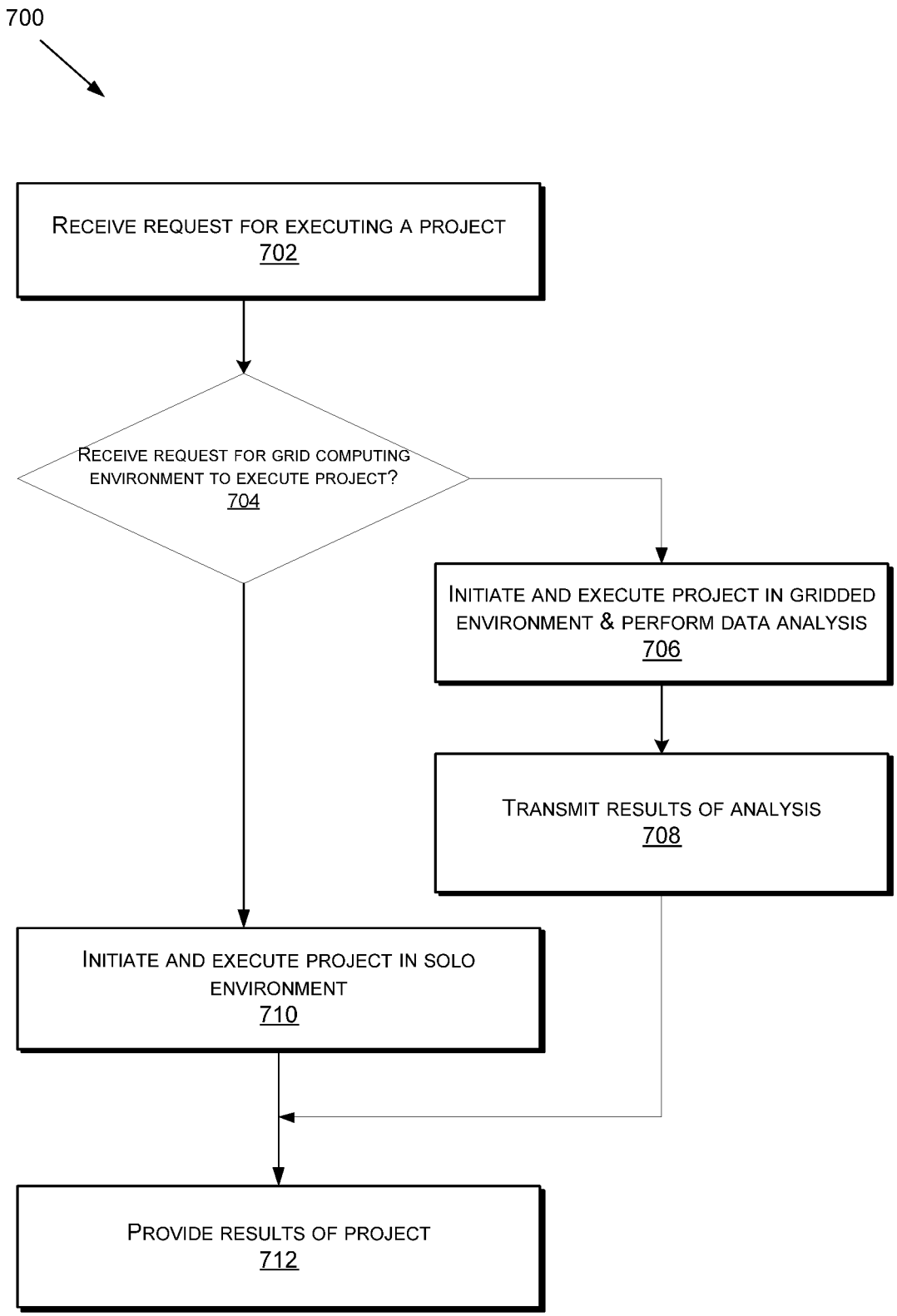
FIG. 7 is a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
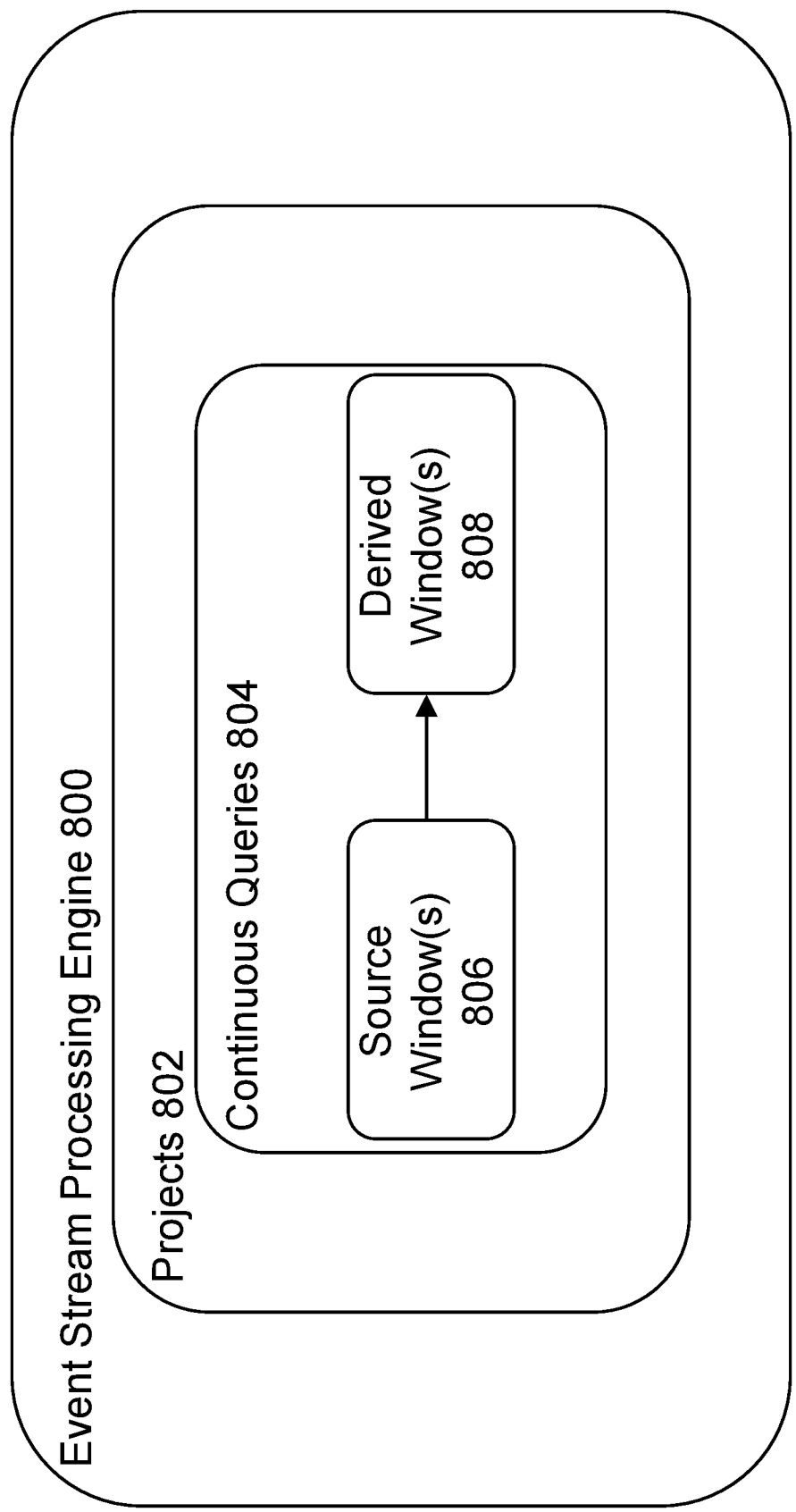
FIG. 8 is a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
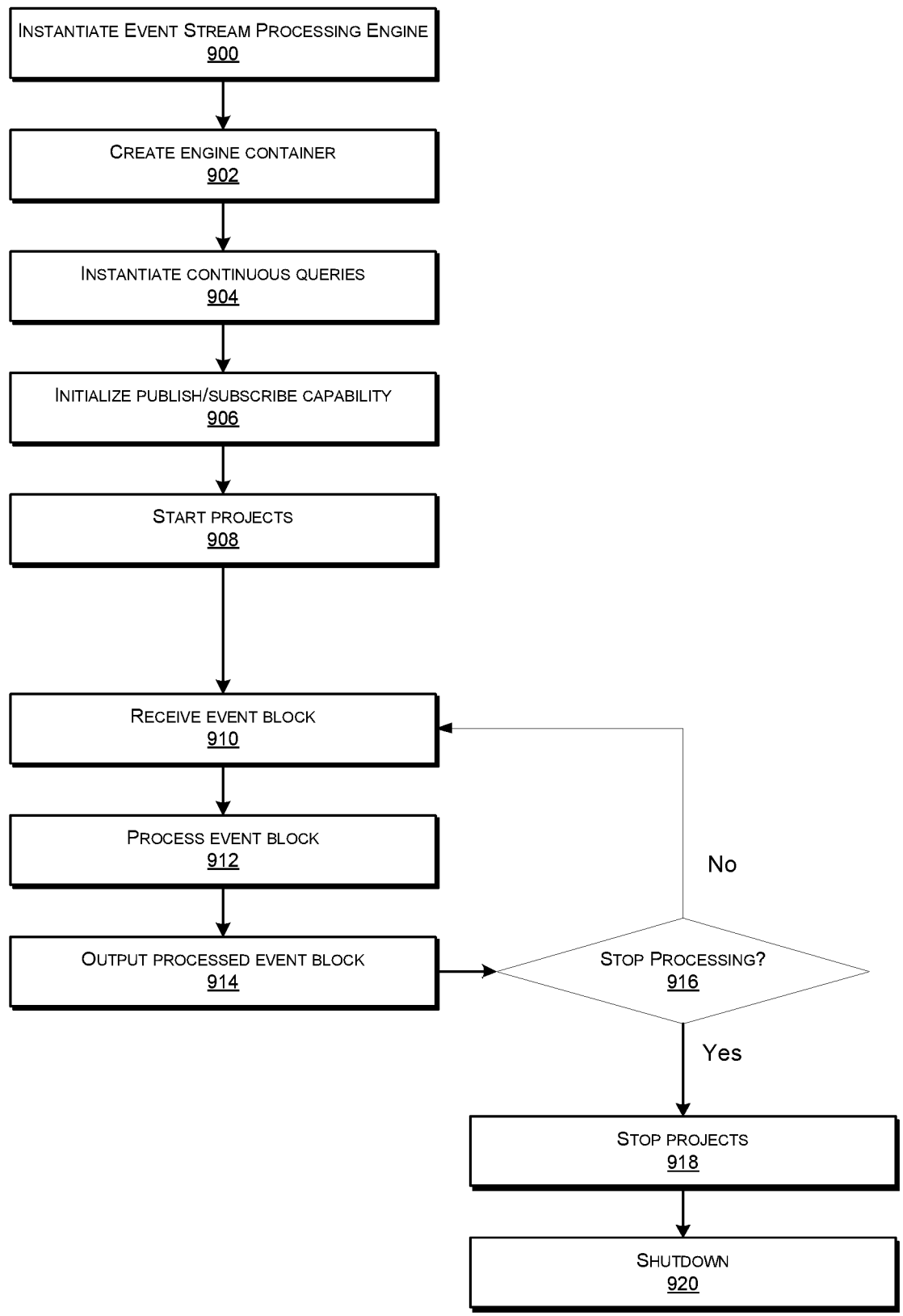
FIG. 9 is a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
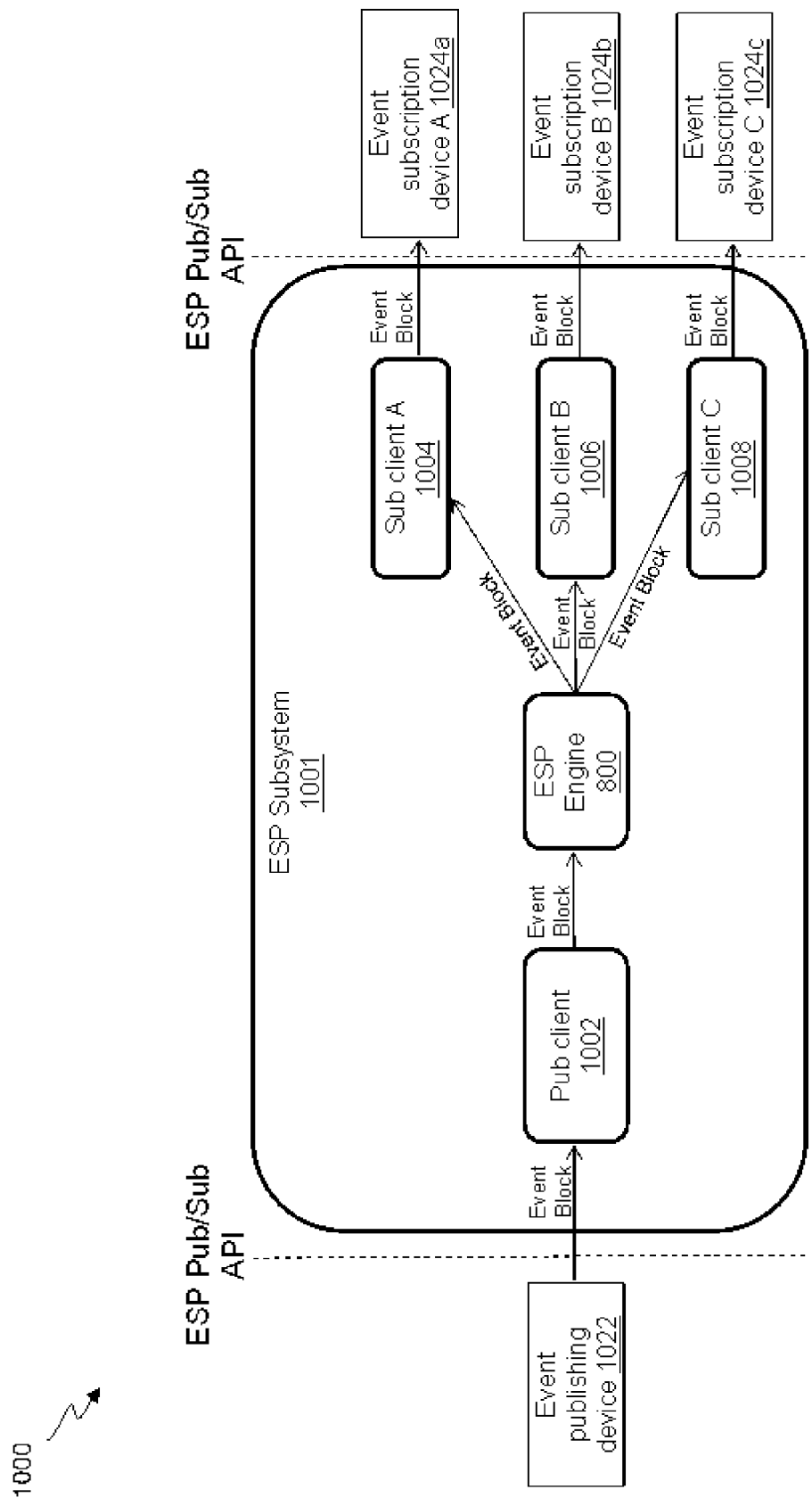
FIG. 10 is a block diagram of an ESP system interfacing between a publishing device and multiple event subscribing devices according to some aspects.

FIG. 10 is a block diagram of an ESP system 1000 interfacing between publishing device 1022 and event subscription devices 1024a-c according to some aspects. ESP system 1000 may include ESP subsystem 1001, publishing device 1022, an event subscription device A 1024a, an event subscription device B 1024b, and an event subscription device C 1024c. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024a, event subscription device B 1024b, and event subscription device C 1024c. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024a, event subscription device B 1024b, and event subscription device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024a, event subscription device B 1024b, and event subscription device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024a using the publish/subscribe API. Subscribing client B 1006 may be started by an event subscription application B executing at event subscription device B 1024b using the publish/subscribe API. Subscribing client C 1008 may be started by an event subscription application C executing at event subscription device C 1024c using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
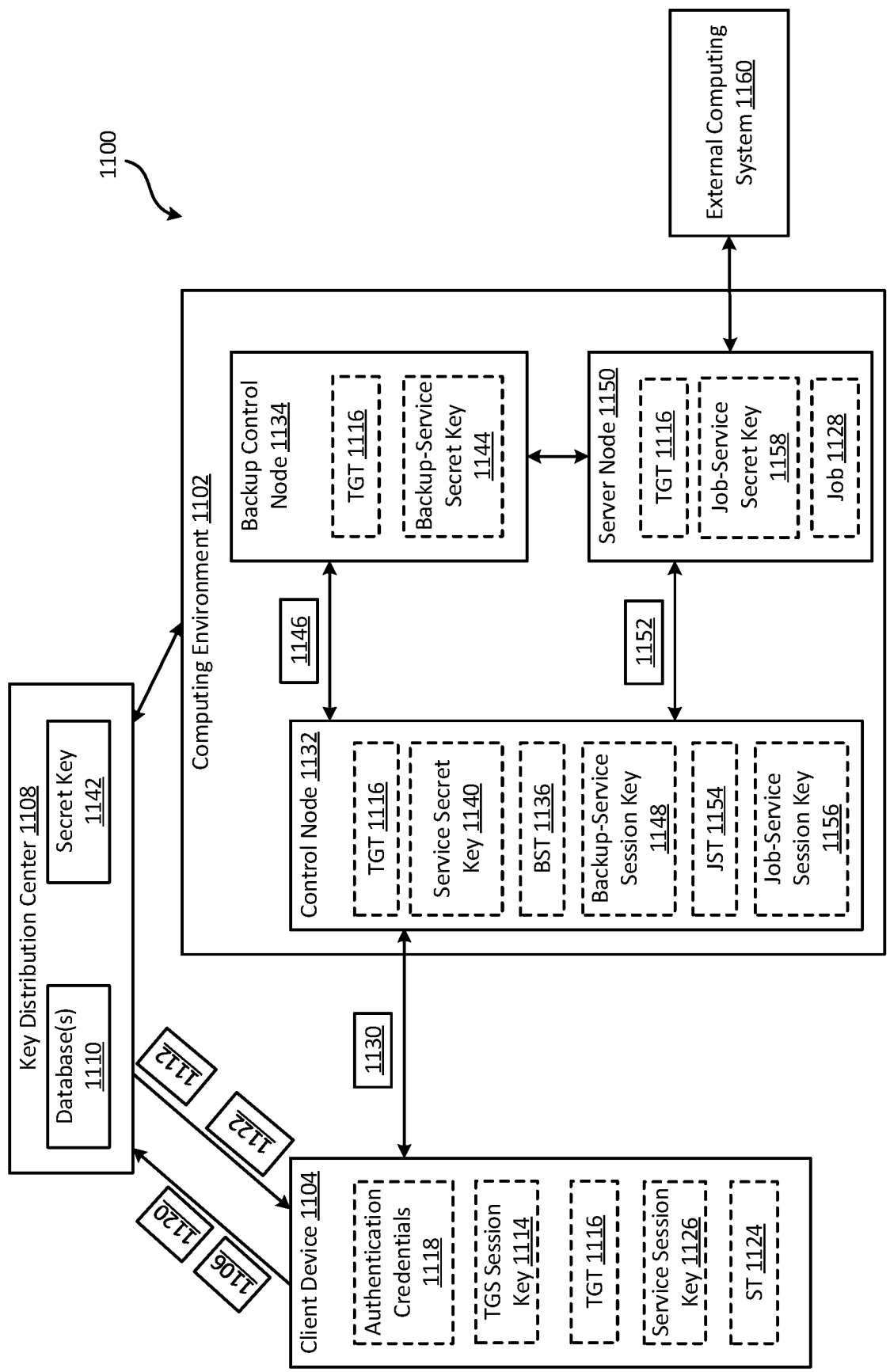
FIG. 11 is a block diagram of an example of a system for secure authentication according to some aspects.

FIG. 11 is a block diagram of an example of a system 1100 for secure authentication according to some aspects. The system 1100 includes a client device 1104 in communication with a computing environment 1102, which may be similar to any of the computing environments discussed above with respect to FIGS. 1-10.

A user of the client device 1104 can enter authentication credentials 1118 to authenticate with the computing environment 1102. Examples of the authentication credentials 1118 can include a username, password, PIN code, a biometric identifier, or any combination of these. The client device 1104 can receive the authentication credentials 1118 and use at least some of them in an authentication process, so as to enable the user to obtain access to one or more job-execution services of the computing environment 1102.

The authentication process can involve a sequence of handshakes. A handshake is a sequence of communications between two or more computing devices implemented in accordance with a predefined protocol. In the example shown in FIG. 11 and described below, the handshakes are Kerberos handshakes according to the Kerberos protocol. But other types of handshakes according to other protocols, such as the New Technology (NT) LAN Manager (NTLM) protocol, are possible and contemplated within the scope of the present disclosure.

The authentication process begins with a first handshake between the client device 1104 and a key distribution center (KDC) 1108 of the system 1100. The client device 1104 can transmit a ticket-grating-ticket (TGT) request 1106 to the KDC 1108, which may be internal or external to the computing environment 1102. The TGT request 1106 may include the username of the user. The KDC 1108 can access a database 1110 storing authorized usernames to determine whether the username for the user exists in one or more databases 1110. If the username for the user exists in the one or more databases 1110, the KDC 1108 can retrieve a password corresponding to the username from the one or more databases 1110, and generate a client secret key based on the password (e.g., by hashing the password). A client secret key is an encryption key unique to the user. The KDC 1108 can then transmit a TGT response 1112 back to the client device 1104, where at least some of the TGT response 1112 is encrypted using the client secret key.

The TGT response 1112 can include a ticket-granting-ticket 1116. The ticket-granting-ticket 1116 can include a user identifier for the user, where the user identifier is different from the username of the user; a service identifier identifying a service of the computing environment 1102 to be accessed (e.g., a job-execution service of the control node 1132); a ticket-granting-service (TGS) session key 1114; or any combination of these. The ticket-granting-ticket 1116 can be encrypted using a secret key 1142 of the KDC 1108, so that the client device 1104 is unable to decrypt it. In some examples, the TGT response 1112 also includes a message. The message can include the TGS session key 1114, and can be encrypted by the KDC 1108 using the client secret key.

The client device 1104 can receive the TGT response 1112. The client device 1104 can then attempt to decrypt the message using the authentication credentials 1118 (e.g., password) input by the user. If the authentication credentials 1118 input by the user are correct, the client device 1104 can decrypt the first message, extract the TGS session key 1114, and store the TGS session key 1114 in memory. The client device 1104 can also store the ticket-granting-ticket 1116 in memory. If the authentication credentials 1118 are incorrect, the client device 104 will be unable to decrypt the first message and the process can halt.

Next, the client device 1104 can engage in a second handshake with the KDC 1108 by transmitting a service ticket request 1120 to the KDC 1108. The service ticket request 1120 is a request for a service ticket to access a service of the computing environment 1102, such as a job-execution service of the control node 1132. The service ticket request 1120 can include the ticket-granting-ticket 1116 and a message. The message can include the user identifier and may be encrypted by the client device 104 using the TGS session key 1114. The KDC 1108 can receive the service ticket request 1120, decrypt the ticket-granting-ticket 1116 using its secret key 1142, extract the TGS session key 1114 therefrom, and use the TGS session key 1114 to decrypt the message. The KDC 1108 can then compare the user identifier in the message to the user identifier in the ticket-granting-ticket 1116 to validate the service ticket request 1120.

Once the service ticket request 1120 has been validated, the KDC 1108 can generate a service ticket response 1122. The service ticket response 1122 can include a service ticket (ST) 1124. The service ticket 1124 may include the user identifier, the service identifier for the requested service, and a service session key 1126. A service session key is a unique identifier of a session corresponding to a requested service. The service ticket 1124 can be encrypted using a service secret key 1140, where a service secret key is an encryption key unique to the service to be accessed (e.g., a job-execution service of the control node 1132). The service ticket response 1122 can also include a message. The message can include the service identifier and the service session key 1126, and may be encrypted using the TGS session key 1114. After generating the service ticket response 1122, the KDC 1108 can transmit the service ticket response 1122 back to the client device 1104.

The client device 1104 can receive the service ticket response 1122, extract the service session key 1126 by decrypting the message using the TGS session key 1114, and store the service session key 1126 in memory. The client device 1104 can also store the service ticket 1124 in memory. At this point, the client device 1104 has enough secure information to interface with the computing environment 1102 to execute jobs.

At a later point in time, the user of the client device 1104 may wish to execute a job 1128 using the computing environment 1102. An example of the job can be a data processing job involving large amounts of data, such as thousands or millions of data points. To initiate the job 1128, the user can direct the client device 1104 to transmit a job request 1130 for executing the job 1128 to the computing environment 1102. The job request 1130 may be a hypertext transfer protocol (HTTP) request. In some examples, the job request 1130 can include the ticket-granting-ticket 1116, the service ticket 1124, and a message. The message can include the user identifier and is encrypted using the service session key 1126.

A control node 1132 of the computing environment 1102 can receive the job request 1130 and validate the service ticket 1124. For example, the control node 1132 can decrypt the service ticket 1124 using its service secret key 1140 to obtain the service session key 1126 therein. The control node 1132 can then decrypt the message using the service session key 1126, extract the user identifier from the message, and validate the service ticket 1124 by comparing the user identifier of the service ticket 1124 to the user identifier of the message. If the service ticket 1124 is valid, the control node 1132 can store the ticket-granting-ticket 1116 for subsequent use.

In some examples, the control node 1132 can next engage in a third handshake with the KDC 1108 to obtain another service ticket for using a backup service associated with a backup control node 1134. The backup control node 1134 can serve as an alternative to the control node 1132 during a failover state in which the control node 1132 is unavailable.

More specifically, the control node 1132 can initiate the third handshake by transmitting a backup-service-ticket request to the KDC 1108, where the backup-service-ticket request is a request for a service ticket to access a backup service of the backup control node 1134. The backup-service-ticket request can include the ticket-granting-ticket 1116a and a message. The message can include the user identifier for the user. The KDC 1108 can receive the backup-service-ticket request and decrypt the ticket-granting-ticket 1116 therein using its secret key 1142. The KDC 1108 can then compare the user identifier in the message to the user identifier in the ticket-granting-ticket 1116 to validate the backup-service-ticket request.

Once the backup-service-ticket request has been validated, the KDC 1108 can generate a backup-service-ticket response. The backup-service-ticket response can include a service ticket for the backup service, which is referred to herein as a backup service ticket ("BST") 1136 in FIG. 11. The backup service ticket 1136 may include the user identifier, a service identifier for the backup service, a service session key ("backup-service session key") 1148 for a session corresponding to the backup service, or any combination of these. The backup service ticket 1136 can be encrypted using another service secret key ("backup-service secret key") 1144 that is unique to the backup service. In some examples, the backup-service-ticket response can also include a message with the service identifier for the backup service and the backup-service session key 1148. After generating the backup-service-ticket response, the KDC 1108 can transmit the backup-service-ticket response back to the control node 1132. The control node 1132 can receive the backup-service-ticket response and store the backup service ticket 1136 in memory.

Next, the control node 1132 can transmit a backup-service authentication request 1146 to the backup control node 1134. The backup-service authentication request 1146 can include the ticket-granting-ticket 1116 and the backup service ticket 1136. The backup-service authentication request 1146 can also include a message. The message can include the user identifier and can be encrypted using the backup-service session key 1148.

The backup control node 1134 can receive the backup-service authentication request 1146 and validate the backup service ticket 1136. For example, the backup control node 1134 can decrypt the backup service ticket 1136 using its backup-service secret key 1144 to obtain the backup-service session key 1148 therein. The backup control node 1134 can then decrypt the message using the backup-service session key 1148, extract the user identifier from the message, and validate the backup service ticket 1136 by comparing the user identifier of the backup service ticket 1136 to the user identifier of the message. If the backup service ticket 1136 is valid, the backup control node 1134 can store the ticket-granting-ticket 1116 for subsequent use.

At this point, both the control node 1132 and the backup control node 1134 have sufficient information to interface with a server node 1150 to execute the job 1128. While only one backup control node 1134 is depicted in FIG. 11, other examples may apply a similar process to two or more backup control nodes so as to have multiple redundancies in case of failures.

To effectuate execution of the job 1128, the control node 1132 can next engage in a fourth handshake with the KDC 1108 to obtain another service ticket for using a job-execution service of the server node 1150. More specifically, the control node 1132 initiate the fourth handshake by transmitting a job-service ticket request to the KDC 1108 for accessing a job-execution service of the server node 1150. The job-service ticket request can include the ticket-granting-ticket 1116 and a message. The message can include the user identifier for the user. The KDC 1108 can receive the job-service ticket request and decrypt the ticket-granting-ticket 1116 therein using its secret key 1142. The KDC 1108 can then compare the user identifier in the message to the user identifier in the ticket-granting-ticket 1116 to validate the job-service ticket request.

Once the job-service ticket request has been validated, the KDC 1108 can generate a job-service ticket response. The job-service ticket response can include another service ticket for the job-execution service, designated as job service ticket ("JST") 1154 in FIG. 11. The job service ticket 1154 may include the user identifier, a service identifier for the job-execution service of the server node 1150, a service session key ("job-service session key") 1156 for a session between the control node 1132 and the server node 1150, or any combination of these. The job service ticket 1154 can be encrypted using another service secret key ("job-service secret key") 1158 that is unique to the job-execution service. In some examples, the job-service ticket response can also include a message with the service identifier for the job-execution service and the job-service secret key 1158. After generating the job-service ticket response, the KDC 1108 can transmit the job-service ticket response back to the control node 1132. The control node 1132 can receive the job-service ticket response and store the job service ticket 1154 in memory.

Next, the client device 1104 can transmit a job-service authentication request 1152 to the server node 1150. The job-service authentication request 1152 can include the ticket-granting-ticket 1116 and the job service ticket 1154. The job-service authentication request 1152 may also include a message. The message can include the user identifier and can be encrypted using the job-service session key 1156.

The server node 1150 can receive the job-service authentication request 1152 and validate the job service ticket 1154. For example, the server node 1150 can decrypt the job service ticket 1154 using its job-service secret key 1158 to obtain the job-service session key 1156 therein. The server node 1150 can then decrypt the message using the job-service session key 1156, extract the user identifier from the message, and validate the job service ticket 1154 by comparing the user identifier in the job service ticket 1154 to the user identifier in the message. If the job service ticket 1154 is valid, the server node 1150 can store the ticket-granting-ticket 1116 for subsequent use.

While the control node 1132 performed the fourth handshake and related interactions with the server node 1150 to authenticate with the job-execution service in the above example, the backup control node 1134 can alternatively execute a similar process, e.g., if the control node 1132 fails. Thus, the backup control node 1134 can alternatively perform the fourth handshake and subsequent interactions with the server node 1150 to establish the appropriate chain of authentication to execute the job 1128.

At this point, the system 100 has established a chain of authentication between the client device 1104 and the server node 1150, such that the server node 1150 can execute the job 1128 on behalf of the user. The authentication process purposefully excludes transmission of the user's most-sensitive authentication credentials, such as the user's username and password, through the computing environment 1102. This can prevent malicious actors from intercepting and obtaining those authentication credentials 1118, should they breach the security of the computing environment 1102. The authentication process also results in the server node 1150 having a copy of the ticket-granting-ticket 1116, which can be used to access an external computing system 1160 as detailed below.

While in many situations the job 1128 can be entirely executed by the computing environment 1102 using only the computing resources that are internal to the computing environment 1102, in other situations the computing environment 1102 may need to access an external computing system 1160 to execute at least some portions of the job 1128. An external computing system is a computing system that is external to the computing environment 1102, where the external computing system has computing resources (e.g., processing power, memory, or databases) suitable for executing at least some portions of the job 1128. And the external computing system 1160 may be secured, requiring authentication for access. In some such situations, the server node 1150 can use the ticket-granting-ticket 1116 stored thereon to obtain access to an external service of the external computing system 1160, and thereby execute those portions of the job 1128.

For example, the server node 1150 can next engage in a fifth handshake with the KDC 1108 to obtain another service ticket for accessing an external service of the external computing system 1160. More specifically, the server node 1150 initiate the fifth handshake by transmitting an external-service ticket request to the KDC 1108 for accessing the external service of the external computing system 1160. The external-service ticket request can include the ticket-granting-ticket 1116 and a message. The message can include the user identifier for the user. The KDC 1108 can receive the service ticket request and decrypt the ticket-granting-ticket 1116 therein using its secret key 1142. The KDC 1108 can then compare the user identifier in the message to the user identifier in the ticket-granting-ticket 1116 to validate the external-service ticket request.

Once the external-service ticket request has been validated, the KDC 1108 can generate an external-service ticket response. The external-service ticket response can include a service ticket for accessing the external service, which can be referred to as an external service ticket. The external service ticket may include the user identifier, a service identifier for the external service of the external computing system 1160, a service session key (an "external-service session key") for a session corresponding to the external service, or any combination of these. The external service ticket can be encrypted using a secret key (an "external-service secret key") that is unique to the external service. In some examples, the external-service ticket response can also include a message. The message can include the service identifier for the external service and the external-service session key. The message can be encrypted using the TGS session key 1114. After generating the external-service ticket response, the KDC 1108 can transmit the external-service ticket response back to the server node 1150. The server node 1150 can receive the external-service ticket response and store the external service ticket in memory.

Next, the server node 1150 can transmit an external-service authentication request to the external computing system 1160. The external-service authentication request can include the ticket-granting-ticket 1116 and the external service ticket. In some examples, the external-service authentication request can also include a message. The message can include the user identifier and can be encrypted using the external-service session key.

The external computing system 1160 can receive the external-service authentication request and validate the external service ticket. For example, the external computing system 1160 can decrypt the external service ticket using its external-service secret key to obtain the external-service session key therein. The external computing system 1160 can then decrypt the message using the external-service session key, extract the user identifier from the message, and validate the external service ticket by comparing the user identifier in the external service ticket to the user identifier of the message. If the external service ticket is valid, the external computing system 1160 can store the ticket-granting-ticket 1116 for subsequent use.

In some examples, the external computing system 1160 can perform a similar process to the one discussed above with one or more additional computing systems (not shown in FIG. 11) to further authenticate with those additional computing systems, thereby expanding the chain of authentication. The additional computing systems can then each do the same thing, and so on. In this way, the chain of authentication can be expanded from the computing environment 1102 to any number and combination of external computing systems. The job 1128 can then be executed using the external computing system(s).

Upon completion of the job 1128, the server node 1150 may delete the ticket-granting-ticket 1116. The server node 1150 can then transmit a job-completion communication to the control node 1132 to notify the control node 1132 that the job 1128 is complete. The control node 1132 can receive the job-completion communication and responsively delete its copies of secure information (e.g., the ticket-granting-ticket 1116, backup service ticket 1136, backup-service session key 1148, job service ticket 1154, job-service session key 1156, or any combination of these). The control node 1132 can also transmit one or more job-completion communications to one or more backup control nodes, such as backup control node 1134. The one or more backup control nodes can receive the one or more job-completion communications and responsively delete their respective copies of secure information (e.g., the ticket-granting-ticket 1116). In this way, the secure information can be removed from the computing environment 1102 upon completion of the job 1128 to prevent the secure information from being copied or stolen by malicious actors.

While the above examples involve requests (e.g., service ticket requests and authentication requests) and responses (e.g., service ticket responses) that include certain types of content, this is intended to be non-limiting. Other examples may involve requests and responses with more, less, or different content than is described above. Likewise, while the above process is described as having a certain steps, this is intended to be non-limiting. Other examples may involve more steps, fewer steps, different steps, or a different order of the steps described above. Additionally, the system 1100 may include more components, fewer components, different components, or a different arrangement of the components than shown in FIG. 11.

Figure 12:
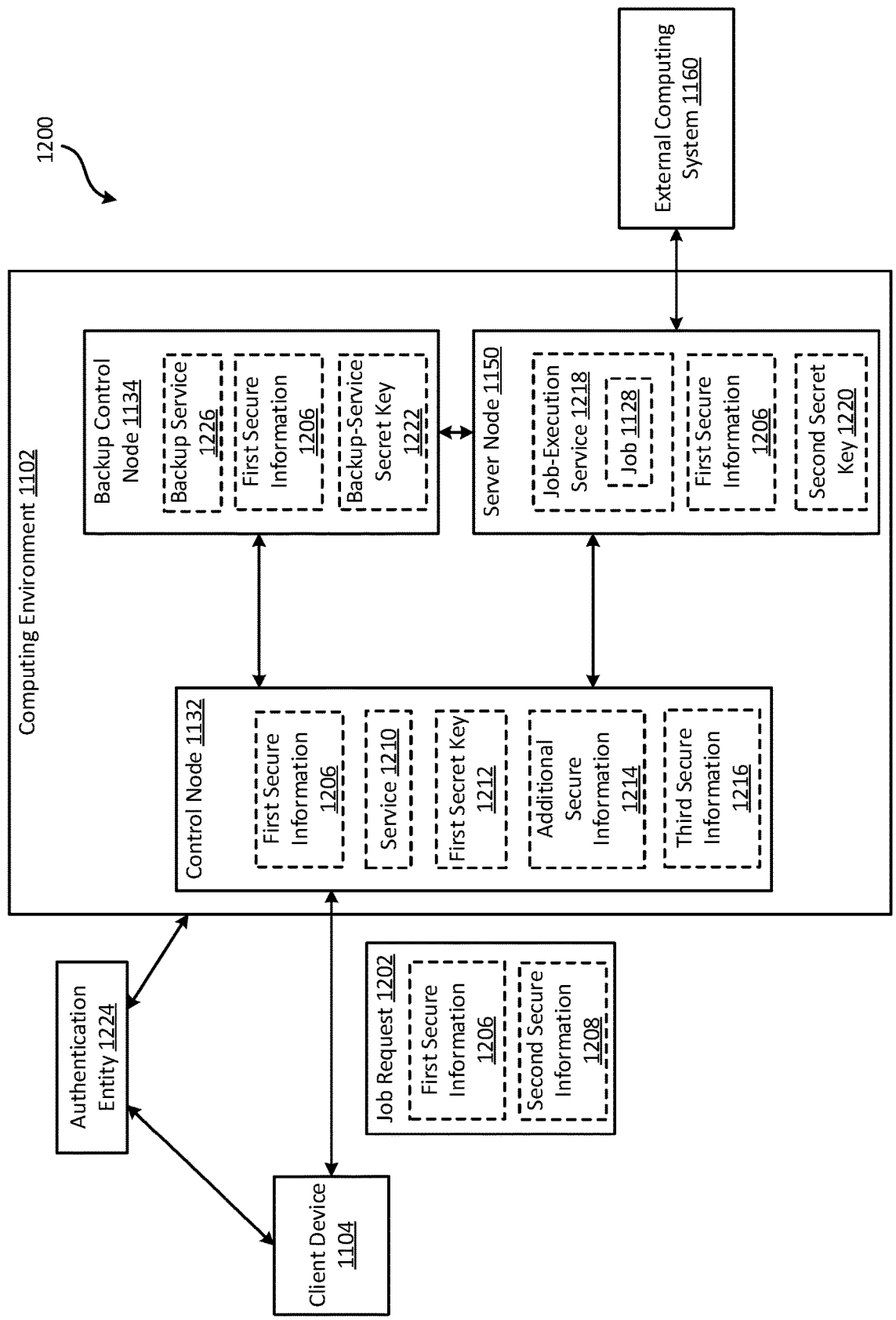
FIG. 12 is a block diagram of another example of a system for secure authentication according to some aspects.

FIG. 12 is a block diagram of another example of a system 1200 for secure authentication according to some aspects. The system 1200 includes the client device 1104, computing environment 1102, control node 1132, backup control node 1134, server node 1150, and external computing system 1160 of FIG. 11. The system 1200 can implement an authentication process (e.g., for single sign-on), which may be similar to the authentication process described above with respect to FIG. 11. As a result, many techniques and features described above may be applied to the authentication process described below.

The authentication process can begin with a first handshake between the client device 1104 and an authentication entity 1224, such as a key distribution center (KDC) 1108. For example, the client device 1104 can transmit a first request for first secure information to the authentication entity 1224, which may be internal or external to the computing environment 1102. The first authentication information can be unique to the user. For instance, the first secure information may be a ticket-granting-ticket associated with the user. The authentication entity 1224 can transmit a response with the first secure information to the first request back to the client device 1104.

In some examples, the client device 1104 can next initiate a second handshake with the authentication entity 1224 by transmitting a second request to the authentication entity 1224. The second request is a request to access a service of the computing environment 1102, such as service 1210 (e.g., a job-execution service or authentication service) of the control node 1132. The second request can include the first secure information.

The authentication entity 1224 can receive the second request and validate it, for example, based on the first secure information in the second request. Once the second request has been validated, the authentication entity 1224 can generate a response that includes second secure information 1208. One example of the second secure information 1208 can include a service ticket, such as service ticket 1124 of FIG. 11. The second secure information 1208 may be unique to the requested service 1210, and may be encrypted such that it can only be decrypted using a first secret key 1212. The authentication entity 1224 can then transmit the response with the second secure information 1208 back to the client device 1104. The client device 1104 can receive the second secure information 1208 and store it in memory.

At this point, the client device 1104 has enough secure information to interface with the computing environment 1102 to execute one or more jobs. For example, the client device 1104 can transmit a job request 1202 for executing the job 1128 to the computing environment 1102. The job request 1202 may be a HTTP request, such as an HTTP negotiate request. In some examples, the job request 1202 can include the first secure information 1206 and the second secure information 1208.

The control node 1132 can receive the job request 1130 and validate the second secure information 1208. This may involve decrypting the second secure information 1208 using the service secret key 1140 to validate the second secure information 1208. If the second secure information 1208 is valid, the control node 1132 can store the first secure information 1206 (e.g., in its own memory or elsewhere in the computing environment 1102) for subsequent use.

In some examples, the control node 1132 can next engage in a third handshake with the authentication entity 1224 to obtain additional secure information 1214 for using a backup service 1226 associated with a backup control node 1134. The backup control node 1134 can serve as an alternative to the control node 1132 during a failover state in which the control node 1132 is unavailable. The control node 1132 initiate the third handshake by transmitting a request for the additional secure information 1214 to the authentication entity 1224, where the request can include the first secure information.

The authentication entity 1224 can receive the request and validate it, for example, based on the first secure information in the request. Once the request has been validated, the authentication entity 1224 can generate a response. The response can include the additional secure information 1214 for the backup service 1226. One example of the additional secure information 1214 can be the backup service ticket 1136 of FIG. 11. The additional secure information 1214 may be unique to the backup service 1226, and may be encrypted such that it can only be decrypted using a backup-service secret key 1222. The authentication entity 1224 can then transmit the response with the additional secure information 1214 back to the control node 1132. The control node 1132 can receive the response and store the additional secure information 1214 in memory.

Next, the client device 1104 can transmit a backup-service authentication request to the backup control node 1134. The backup-service authentication request can include the first secure information 1206 and the additional secure information 1214. The backup control node 1134 can receive the backup-service authentication request and validate the additional secure information 1214. This may involve decrypting the additional secure information 1214 using the backup-service secret key 1222. If the additional secure information 1214 is valid, the backup control node 1134 can store the first secure information 1206 for subsequent use.

At this point, both the control node 1132 and the backup control node 1134 have sufficient information to interface with a server node 1150 to execute a job-execution service 1218 thereon. While only one backup control node 1134 is depicted in FIG. 12, other examples may apply a similar process to two or more backup control nodes so as to have multiple redundancies in case of failures.

To effectuate execution of the job 1128, the control node 1132 can next engage in a fourth handshake with the authentication entity 1224 to obtain third secure information 1216 for using the job-execution service 1218 of the server node 1150. For example, the control node 1132 initiate the fourth handshake by transmitting a request to the authentication entity 1224 for accessing the job-execution service 1218. The request can include the first secure information 1206. The authentication entity 1224 can validate the first secure information 1206 and generate a response. The response can include third secure information 1216. One example of the third secure information 1216 can include the job service ticket 1154 of FIG. 11. The third secure information 1216 may be unique to the job-execution service 1218, and may be encrypted such that it can only be decrypted using a second secret key 1220. The authentication entity 1224 can then transmit the response with the third secure information 1216 back to the control node 1132. The control node 1132 can receive the response and store the third secure information 1216 in memory.

Next, the control node 1132 can transmit a job-service authentication request to the server node 1150. The job-service authentication request can include the first secure information 1206 and the third secure information 1216. The server node 1150 can receive the job-service authentication request and validate the third secure information 1216. This may involve decrypting the third secure information 1216 using the second secret key 1220. If the third secure information 1216 is valid, the server node 1150 can store the first secure information 1206 for subsequent use.

While the control node 1132 performed the fourth handshake and related interactions with the server node 1150 to authenticate with the job-execution service 1218 in the above example, the backup control node 1134 can alternatively execute a similar process, e.g., if the control node 1132 fails. Thus, the backup control node 1134 can alternatively perform the fourth handshake and subsequent interactions with the server node 1150 to establish the appropriate chain of authentication to execute the job 1128.

At this point, the system 100 has established a chain of authentication between the client device 1104 and the server node 1150, such that the server node 1150 can execute the job 1128 on behalf of the user. The authentication process may exclude transmission of the user's most-sensitive authentication credentials, such as the user's password, through the computing environment 1102. This can prevent malicious actors from obtaining those authentication credentials 1118 should they breach the security of the computing environment 1102. The authentication process may also result in the server node 1150 having a copy of the first secure information 1206, which can be used to access an external computing system 1160 as detailed below.

While in many situations the job 1128 can be entirely executed by the computing environment 1102 using only the computing resources that are internal to the computing environment 1102, in other situations the computing environment 1102 may need to access an external computing system 1160 to execute at least some portions of the job 1128. And the external computing system 1160 may be secured, requiring authentication for access. In some such situations, the server node 1150 can use the first secure information 1206 stored thereon to obtain access to an external service of the external computing system 1160, and thereby execute those portions of the job 1128. This can be implemented similarly to the process discussed above with respect to FIG.

For example, the server node 1150 can next engage in a fifth handshake with the authentication entity 1224 to obtain fourth secure information for accessing an external service of the external computing system 1160. More specifically, the server node 1150 initiate the fifth handshake by transmitting an external-service request to the authentication entity 1224 for accessing the external service of the external computing system 1160. The external-service request can include the first secure information 1206 The authentication entity 1224 can validate the first secure information 1206 and, once validated, generate an external-service response. The external-service response can include the fourth secure information for accessing the external service. One example of the fourth secure information can include the external service ticket of FIG. 11. The fourth secure information may be unique to the external service, and may be encrypted such that it can only be decrypted using an external-service secret key (e.g., that is accessible to the external computing system 1160 and not the computing environment 1102). The authentication entity 1224 can then transmit the external-service response back to the server node 1150. The server node 1150 can receive response and store the fourth secure information in memory.

Next, the server node 1150 can transmit an external-service authentication request to the external computing system 1160. The external-service authentication request can include the first secure information 1206 and the fourth secure information. The external computing system 1160 can receive the external-node authentication request and validate the fourth secure information. This may involve decrypting the fourth secure information using the external-service secret key of the external computing system 1160. If the fourth secure information is valid, the external computing system 1160 may store the first secure information for subsequent use.

In some examples, the external computing system 1160 can perform a similar process to the one discussed above with one or more additional computing systems (not shown in FIG. 12) to further authenticate with those additional computing systems, thereby expanding the chain of authentication. The additional computing systems can each do the same thing, and so on. In this way, a daisy chain of authentication can be established between the computing environment 1102 and any number and combination of external computing systems. The job 1128 can then be executed using the external computing system(s).

Upon completion of the job 1128, the server node 1150 may delete the first secure information. The server node 1150 can then transmit a communication to the control node 1132 to notify the control node 1132 that the job 1128 is complete. The control node 1132 can receive the communication and responsively delete its copies of secure information (e.g., the first secure information, additional secure information 1214, third secure information 1216, or any combination of these). The control node 1132 can also transmit one or more additional communications to one or more backup control nodes, such as backup control node 1134. The one or more backup control nodes can receive the one or more additional communications and responsively delete their respective copies of secure information (e.g., first secure information 1206). In this way, the secure information can be removed from the computing environment 1102 upon completion of the job 1128 to prevent the secure information from being copied or stolen by malicious actors.

While the above examples involve requests and responses that include certain types of content, this is intended to be non-limiting. Other examples may involve requests and responses with more, less, or different content than is described above. Likewise, although the above process is described as having a certain steps, this is intended to be non-limiting. Other examples may involve more steps, fewer steps, different steps, or a different order of the steps described above. Additionally, the system 1200 may include more components, fewer components, different components, or a different arrangement of the components than shown in FIG. 12.

Figure 13:
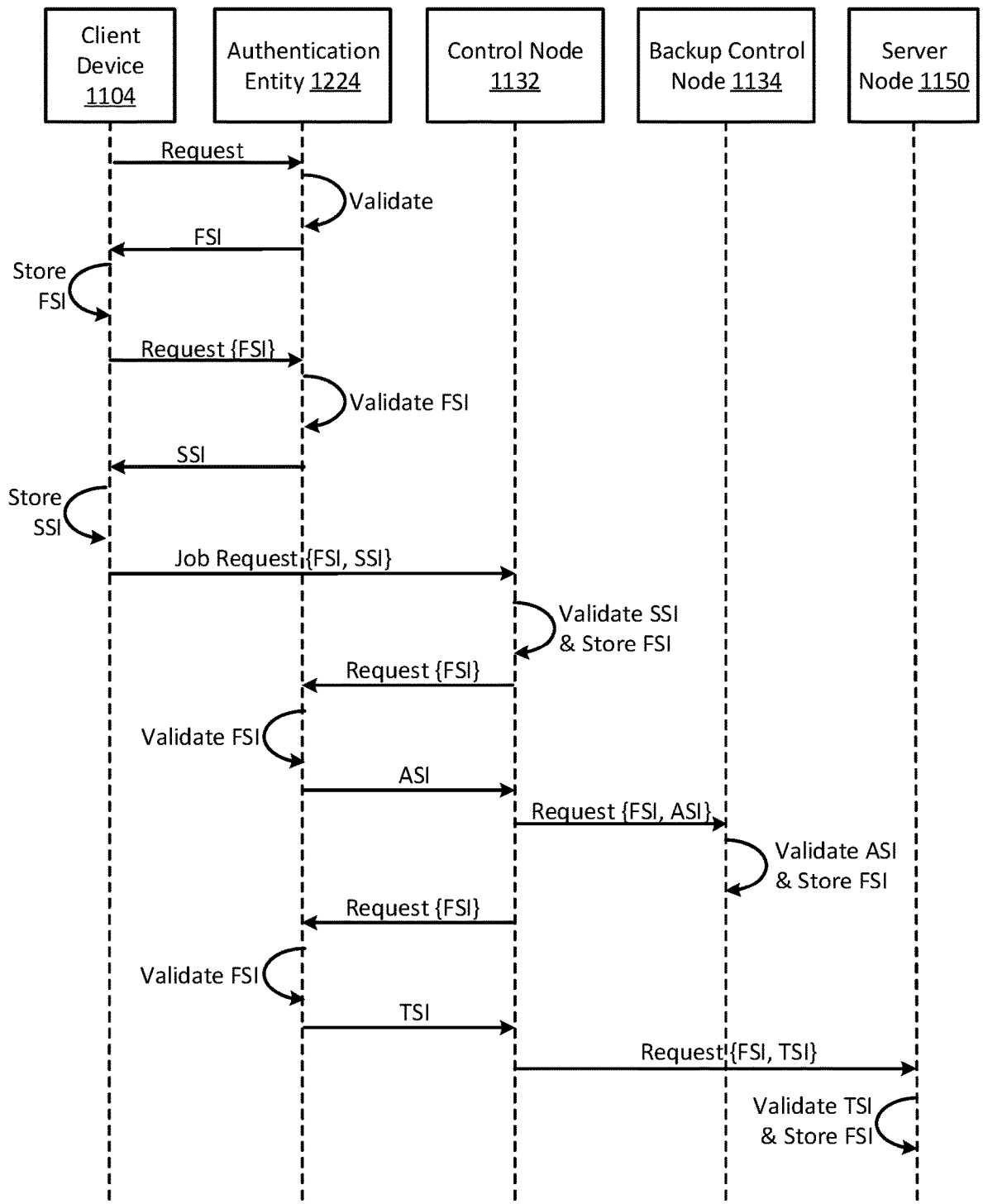
FIG. 13 is a sequence diagram of an example of an authentication process according to some aspects.

FIG. 13 is a sequence diagram of an example of an authentication process according to some examples. Although FIG. 13 depicts a particular sequence of operations, other examples can include more operations, fewer operations, different operations, or a different order of operations. FIG. 13 is described below with reference to the components of FIG. 12 discussed above.

The authentication process begins with the client device 1104 transmitting a request to the authentication entity 1224. The authentication entity 1224 can receive the request, validate it (e.g., by comparing information in the first request to information stored in a database), and transmit first secure information (FSI) 1206 back to the client device 1104 in response. The client device 1104 can store the first secure information 1206.

Next, the client device 1104 can transmit a request associated with a service 1210 of the control node 1132 to the authentication entity 1224. The request includes the first secure information 1206, as indicated by "{FSI}" in FIG. 13. The authentication entity 1224 can receive the request, validate it based on the first secure information 1206, and transmit second secure information (SSI) 1208 back to the client device 1104 in response. The second secure information 1208 is different from the first secure information 1206 and may be unique to the service of the control node 1132. The client device 1104 can store the second secure information 1208.

The client device 1104 can then transmit a job request 1202 for executing a job 1128 to the control node 1132. The job request 1202 can include the first secure information 1206 and the second secure information 1208, as indicated by "{FSI, SSI}" in FIG. 13. The control node 1132 can receive the job request 1202 and validate it based on the second secure information 1208. Upon validating the job request 1202, the client device 1104 is authenticated to use the service of the control node 1132. The control node 1132 can also store the first secure information 1206 for subsequent use.

In some examples, the control node 1132 can next transmit a request associated with a backup service 1226 of the backup control node 1134 to the authentication entity 1224, where the request includes the first secure information 1206. The authentication entity 1224 can receive the request, validate it based on the first secure information 1206, and transmit additional secure information (ASI) 1214 back to the control node 1132 in response. The additional secure information 1214 is different from the second secure information 1208 and the first secure information 1206, and may be unique to the backup service 1226 of the backup control node 1134. The control node 1132 can receive and store the additional secure information 1214.

After receiving the additional secure information 1214, the control node 1132 can transmit a request to use the backup service to the backup control node 1134. The request includes the first secure information 1206 and the additional secure information 1214, as indicated by "{FSI, ASI}" in FIG. 13. The backup control node 1134 can receive the request and validate it based on the additional secure information 1214. The backup control node 1134 may also store the first secure information 1206 for subsequent use. This may enable the backup control node 1134 to serve as an alternative to the control node 1132 should the control node 1132 become unavailable, such as during failover.

Thereafter, the control node 1132 can transmit a request associated with a job-execution service of the server node 1150 to the authentication entity 1224, where the request includes the first secure information 1206. The authentication entity 1224 can receive the request, validate it based on the first secure information 1206, and transmit third secure information (TSI) 1216 back to the control node 1132 in response. The third secure information 1216 is different from the second secure information 1208 and the first secure information 1206, and may be unique to the job-execution service of the server node 1150. The control node 1132 can receive and store the third secure information 1216.

After receiving the third secure information 1216, the control node 1132 can transmit a request to the server node 1150 to use the job-execution service. The request includes the first secure information 1206 and the third secure information 1216, as indicated by "{FSI, TSI}" in FIG. 13. The server node 1150 can receive the request and validate it based on the third secure information 1216, thereby creating a daisy chain of authentication between the client device 1104, the control node 1132, and the server node 1150, which encompasses the service of the control node 1132 and the job-execution service of the server node 1150. After validating the third secure information 1215, the server node 1150 can execute the requested job.

In some examples, the server node 1150 can also store the first secure information 1206, which can enable the server node 1150 to access one or more external computing systems 1160 to perform at least a portion of the requested job, if necessary.

For example, the server node 1150 can transmit a request associated with an external service of an external computing system 1160 to the authentication entity 1224, where the request includes the first secure information 1206. The authentication entity 1224 can receive the request, validate it based on the first secure information 1206, and transmit fourth secure information back to the control node 1132 in response. The fourth secure information is different from the third secure information 1216, the second secure information 1208, and the first secure information 1206, and may be unique to the external service of the external computing system 1160. The server node 1150 can receive and store the fourth secure information.

After receiving the fourth secure information, the server node 1150 can transmit a request to the external computing system 1160 to use the external service. The request includes the first secure information 1206 and the fourth secure information. The external computing system 1160 can receive the request and validate it based on the fourth secure information, thereby enlarging the daisy chain of authentication between the client device 1104, the control node 1132, the server node 1150, and the external computing system 1160, which in turn encompasses the service of the control node 1132, the job-execution service of the server node 1150, and the external service of the external computing system 1160.

After validating the fourth secure information, the external computing system 1160 can execute at least a portion of the requested job. In some examples, the external computing system 1160 can further use the first secure information 1206 in a similar manner as discussed above to obtain access one or more additional external computing systems (e.g., if necessary to perform at least a portion of the requested job), thereby further enlarging the daisy chain of authentication.

Figure 14:
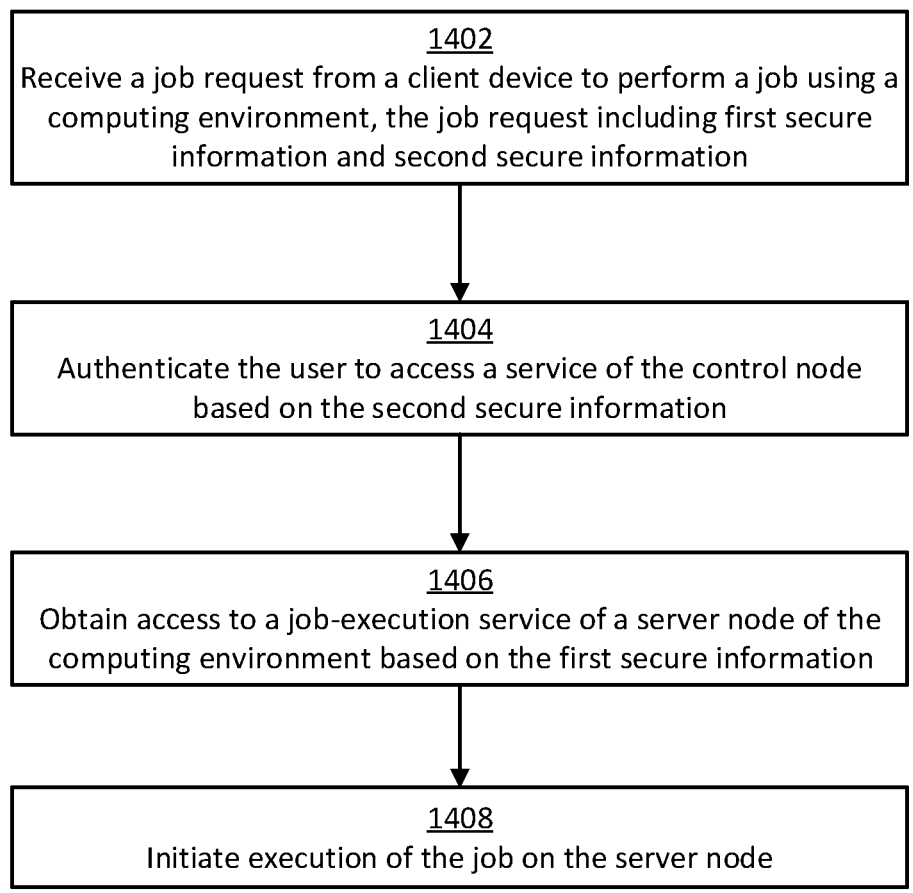
FIG. 14 is a flow chart of an example of an authentication process according to some aspects.

FIG. 14 is a flow chart of an example of an authentication process according to some examples. Although FIG. 14 depicts a particular sequence of operations, other examples can include more operations, fewer operations, different operations, or a different order of operations. FIG. 14 is described below with reference to the components of FIG. 12 discussed above.

In block 1402, a processing device (e.g., of the control node 1132) receives a job request 1202 from a client device 1104 to perform a job 1128 using a computing environment 1102. The job request 1202 can include first secure information 1206, second secure information 1208, or both of these.

The first secure information 1206 may be unique to a user of the client device 1104, or unique to the client device 1104 itself. The first secure information 1206 can be generated by an authentication entity 1224, and thus may not be input by the user. The first secure information 1206 can exclude traditional authentication credentials, like a username and password.

The second secure information 1208 may be unique to a service 1210 of the control node 1132 for enabling access to the service 1210. The second secure information 1208 may also be generated by the authentication entity 1224, and thus may not be input by the user. The second secure information 1208 can also exclude traditional authentication credentials, like a username and password.

In block 1404, the processing device authenticates the user (or the client device 1104) to access the service 1210 of the control node 1132. This may involve validating the second secure information 1208 using a first secret key 1212, which can be unique to the service 1210 or the control node 1132.

In block 1406, the processing device obtains access to a job-execution service 1218 of a server node 1150 of the computing environment 1102 based on the first secure information 1206. This may involve, for example, transmitting the first secure information 1206 to the authentication entity 1224. The authentication entity 1224 can validate the first secure information 1206, and responsively generate and transmit third secure information 1216 back to the control node 1132. The third secure information 1216 can be unique to the job-execution service 1218 of the server node 1150. Once the control node 1132 has received the third secure information 1132, the control node 1132 can then transmit the third secure information 1216 to the server node 1150. The server node 1150 can validate the third secure information 1216 and responsively authorize the control node 1132 to access the job-execution service 1218 (e.g., on behalf of the user). In some examples, the server node 1150 can validate the third secure information 1216 using a second secret key 1220, which can be unique to the job-execution service 1218 or the server node 1150.

In block 1408, the processing device initiates execution of the job 1128 on the server node 1150 (e.g., on behalf of the user), in response to obtaining access to the job-execution service. For example, the processing device can convey job information to the server node 1150 to enable the server node 1150 to execute the job 1128.

Although FIGS. 11-14 have been described with respect to job execution and job-execution services, other examples may involve other types of services for performing other functions via the computing environment 1102. The examples described herein are not intended to be limiting on the types of services to which the aforementioned processes are applicable.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A control node comprising:
a processing device; and
a memory device including instructions that are executable by the processing device for causing the processing device to:
  receive a job request from a client device to perform a job using a computing environment that includes the control node, the job request including first secure information that is unique to a user of the client device and second secure information that is unique to a service of the control node;
  in response to the job request, authenticate the user to access the service of the control node by validating the second secure information using a first secret key that is unique to the service;
  subsequent to authenticating the user to access the service, obtain access to a job-execution service of a server node of the computing environment using the first secure information by:
    transmitting the first secure information to an authentication entity;
    receiving third secure information back from the authentication entity in response to the authentication entity validating the first secure information, the third secure information being unique to the job-execution service of the server node; and
    transmitting the third secure information to the server node, the server node being configured to validate the third secure information using a second secret key and responsively authorize the control node to access the job-execution service on behalf of the user; and
  in response to obtaining access to the job-execution service, initiate execution of the job on the server node on behalf of the user.

2. The control node of claim 1, wherein:
the first secure information is a first encrypted ticket generated by the authentication entity;
the second secure information is a second encrypted ticket generated by the authentication entity; and
the third secure information is a third encrypted ticket generated by the authentication entity.

3. The control node of claim 2, wherein:
the first secure information is a ticket-granting ticket in accordance with a Kerberos protocol;
the second secure information is a service ticket that is unique to the service of the control node and generated in accordance with the Kerberos protocol;
the third secure information is another service ticket that is unique to the job-execution service of the server node and generated in accordance with the Kerberos protocol; and
the authentication entity is a key distribution center in accordance with the Kerberos protocol.

4. The control node of claim 1, wherein the authentication entity is remote from the client device and the computing environment, and wherein the second secret key is unique to the job-execution service.

5. The control node of claim 1, wherein the memory device further includes instructions that are executable by the processing device for causing the processing device to:
  receive additional secure information that is unique to a backup service of a backup control node of the computing environment, the backup control node being configured to serve as an alternative control node during a failover state in which the control node is unavailable; and
  transmit the first secure information and the additional secure information to the backup control node of the computing environment, the backup control node being configured to store the first secure information in response to validating the additional secure information using a backup-service secret key that is unique to the backup service;
  wherein the backup control node is configured to use the first secure information during the failover state to access the job-execution service of the server node and submit one or more jobs on behalf of the user to the server node.

6. The control node of claim 5, wherein the memory device further includes instructions that are executable by the processing device for causing the processing device to transmit the additional secure information to the backup control node prior to obtaining access to the job-execution service of the server node.

7. The control node of claim 5, wherein the memory device further includes instructions that are executable by the processing device for causing the processing device to:
  determine that the job is complete; and
  based on determining that the job is complete:
    delete the first secure information, the additional secure information, and the third secure information from the control node; and
    transmit a communication to the backup control node, the communication being configured to cause the backup control node to delete the first secure information.

8. The control node of claim 1, wherein the memory device further includes instructions that are executable by the processing device for causing the processing device to transmit the first secure information to the server node for storage on the server node.

9. The control node of claim 8, wherein executing the job involves using computing resources of an external computing system that is external to the computing environment, and wherein the server node is configured to execute the job at least in part by authenticating with the external computing system using the first secure information.

10. The control node of claim 1, wherein the first secure information and the second secure information both exclude a username and a password of the user.

11. A non-transitory computer-readable medium comprising program code that is executable by a processing device of a control node for causing the processing device to:
  receive a job request from a client device to perform a job using a computing environment that includes the control node, the job request including first secure information that is unique to a user of the client device and second secure information that is unique to a service of the control node;

in response to the job request, authenticate the user to access the service of the control node by validating the second secure information using a first secret key that is unique to the service;
subsequent to authenticating the user to access the service, obtain access to a job-execution service of a server node of the computing environment using the first secure information by:
  transmitting the first secure information to an authentication entity;
  receiving third secure information back from the authentication entity in response to the authentication entity validating the first secure information, the third secure information being unique to the job-execution service of the server node; and
  transmitting the third secure information to the server node, the server node being configured to validate the third secure information using a second secret key and responsively authorize the control node to access the job-execution service on behalf of the user; and
in response to obtaining access to the job-execution service, initiate execution of the job on the server node on behalf of the user.

12. The non-transitory computer-readable medium of claim 11, wherein:
the first secure information is a first encrypted ticket generated by the authentication entity;
the second secure information is a second encrypted ticket generated by the authentication entity; and
the third secure information is a third encrypted ticket generated by the authentication entity.

13. The non-transitory computer-readable medium of claim 12, wherein:
the first secure information is a ticket-granting ticket in accordance with a Kerberos protocol;
the second secure information is a service ticket that is unique to the service of the control node and generated in accordance with the Kerberos protocol;
the third secure information is another service ticket that is unique to the job-execution service of the server node and generated in accordance with the Kerberos protocol; and
the authentication entity is a key distribution center in accordance with the Kerberos protocol.

14. The non-transitory computer-readable medium of claim 11, wherein the authentication entity is remote from the client device and the computing environment, and wherein the second secret key is unique to the job-execution service.

15. The non-transitory computer-readable medium of claim 11, further comprising program code that is executable by the processing device for causing the processing device to:
receive additional secure information that is unique to a backup service of a backup control node of the computing environment, the backup control node being configured to serve as an alternative control node during a failover state in which the control node is unavailable; and
transmit the first secure information and the additional secure information to the backup control node of the computing environment, the backup control node being configured to store the first secure information in response to validating the additional secure information using a backup-service secret key that is unique to the backup service;
wherein the backup control node is configured to use the first secure information during the failover state to access the job-execution service of the server node and submit one or more jobs on behalf of the user to the server node.

16. The non-transitory computer-readable medium of claim 15, further comprising program code that is executable by the processing device for causing the processing device to transmit the additional secure information to the backup control node prior to obtaining access to the job-execution service of the server node.

17. The non-transitory computer-readable medium of claim 15, further comprising program code that is executable by the processing device for causing the processing device to:
determine that the job is complete; and
based on determining that the job is complete:
  delete the first secure information, the additional secure information, and the third secure information from the control node; and
  transmit a communication to the backup control node, the communication being configured to cause the backup control node to delete the first secure information.

18. The non-transitory computer-readable medium of claim 11, further comprising program code that is executable by the processing device for causing the processing device to transmit the first secure information to the server node for storage on the server node.

19. The non-transitory computer-readable medium of claim 18, wherein executing the job involves using computing resources of an external computing system that is external to the computing environment, and wherein the server node is configured to execute the job at least in part by authenticating with the external computing system using the first secure information.

20. The non-transitory computer-readable medium of claim 11, wherein the first secure information and the second secure information both exclude a username and a password of the user.

21. A method comprising:
receiving, by a processing device of a control node, a job request from a client device to perform a job using a computing environment that includes the control node, the job request including first secure information that is unique to a user of the client device and second secure information that is unique to a service of the control node;
in response to the job request, authenticating, by the processing device, the user to access the service of the control node by validating the second secure information using a first secret key that is unique to the service;
subsequent to authenticating the user to access the service, obtaining, by the processing device, access to a job-execution service of a server node of the computing environment using the first secure information by:
  transmitting the first secure information to an authentication entity;
  receiving third secure information back from the authentication entity in response to the authentication entity validating the first secure information, the third secure information being unique to the job-execution service of the server node; and
  transmitting the third secure information to the server node, the server node being configured to validate the third secure information using a second secret key and responsively authorize the control node to access the job-execution service on behalf of the user; and in response to obtaining access to the job-execution service, initiating, by the processing device, execution of the job on the server node on behalf of the user.

22. The method of claim 21, wherein:

the first secure information is a first encrypted ticket generated by the authentication entity;

the second secure information is a second encrypted ticket generated by the authentication entity; and the third secure information is a third encrypted ticket generated by the authentication entity.

23. The method of claim 22, wherein:

the first secure information is a ticket-granting ticket in accordance with a Kerberos protocol;

the second secure information is a service ticket that is unique to the service of the control node and generated in accordance with the Kerberos protocol;

the third secure information is another service ticket that is unique to the job-execution service of the server node and generated in accordance with the Kerberos protocol; and the authentication entity is a key distribution center in accordance with the Kerberos protocol.

24. The method of claim 21, wherein the authentication entity is remote from the client device and the computing environment, and wherein the second secret key is unique to the job-execution service.

25. The method of claim 21, further comprising:

receiving additional secure information that is unique to a backup service of a backup control node of the computing environment, the backup control node being configured to serve as an alternative control node during a failover state in which the control node is unavailable; and transmitting the first secure information and the additional secure information to the backup control node of the computing environment, the backup control node being configured to store the first secure information in response to validating the additional secure information using a backup-service secret key that is unique to the backup service;

wherein the backup control node is configured to use the first secure information during the failover state to access the job-execution service of the server node and submit one or more jobs on behalf of the user to the server node.

26. The method of claim 25, further comprising transmitting the additional secure information to the backup control node prior to obtaining access to the job-execution service of the server node.

27. The method of claim 25, further comprising:

determining that the job is complete; and based on determining that the job is complete:

deleting the first secure information, the additional secure information, and the third secure information from the control node; and transmitting a communication to the backup control node, the communication being configured to cause the backup control node to delete the first secure information.

28. The method of claim 25, further comprising transmitting the first secure information to the server node for storage on the server node.

29. The method of claim 25, wherein executing the job involves using computing resources of an external computing system that is external to the computing environment, and wherein the server node is configured to execute the job at least in part by authenticating with the external computing system using the first secure information.

30. The method of claim 21, wherein the first secure information and the second secure information both exclude a username and a password of the user.

* * * * *